(12) United States Patent
Yokoi et al.

(10) Patent No.: US 10,459,893 B2
(45) Date of Patent: Oct. 29, 2019

(54) COMPUTER SYSTEM, FILE STORAGE APPARATUS, AND STORAGE CONTROL METHOD

(71) Applicant: Hitachi, Ltd., Tokyo (JP)

(72) Inventors: Kazuhito Yokoi, Tokyo (JP); Go Kojima, Tokyo (JP); Takuya Oda, Tokyo (JP); Yasushi Miyata, Tokyo (JP); Masanori Takata, Tokyo (JP); Hitoshi Kamei, Tokyo (JP); Akiyoshi Tsuchiya, Tokyo (JP)

(73) Assignee: HITACHI, LTD., Tokyo (JP)

( * ) Notice: Subject to any disclaimer, the term of this patent is extended or adjusted under 35 U.S.C. 154(b) by 203 days.

(21) Appl. No.: 15/543,935

(22) PCT Filed: Jan. 30, 2015

(86) PCT No.: PCT/JP2015/052621
§ 371 (c)(1),
(2) Date: Jul. 14, 2017

(87) PCT Pub. No.: WO2016/121082
PCT Pub. Date: Aug. 4, 2016

(65) Prior Publication Data
US 2018/0018347 A1    Jan. 18, 2018

(51) Int. Cl.
*G06F 17/30* (2006.01)
*G06F 16/188* (2019.01)
(Continued)

(52) U.S. Cl.
CPC ............ *G06F 16/188* (2019.01); *G06F 16/13* (2019.01); *G06F 16/16* (2019.01); *G06F 16/1827* (2019.01); *G06F 16/1873* (2019.01)

(58) Field of Classification Search
CPC ..... G06F 16/16; G06F 16/188; G06F 16/1827
See application file for complete search history.

(56) References Cited

U.S. PATENT DOCUMENTS 8,825,597 B1    9/2014    Houston et al.
2012/0072397 A1    3/2012    Esaka
(Continued)

FOREIGN PATENT DOCUMENTS

| JP | H11-312112 A | 11/1999 |
|---|---|---|
| JP | 2013-065181 A | 4/2013 |
| WO | 2014128819 A1 | 8/2014 |

OTHER PUBLICATIONS

International Search Report and Written Opinion for PCT App No. PCT/JP2015/052621 dated Mar. 3, 2015, 13 pgs.

*Primary Examiner* — Syed H Hasan
(74) *Attorney, Agent, or Firm* — Procopio, Cory, Hargreaves & Savitch LLP

(57) ABSTRACT

The purpose of the present invention is, in a file storage, to shorten an access response time to shared data. When a file storage apparatus receives a command for a specific manipulation of a file system, a specific apparatus determines, based on a state of the file system and a manipulation history, whether or not an unapplied manipulation affects a target of the specific manipulation, the unapplied manipulation being a manipulation which has been previously executed by another file storage apparatus among a plurality of file storage apparatuses and which has not been applied to the file system. When it is determined that the unapplied manipulation affects the target of the specific manipulation, the file storage apparatus applies the unapplied manipulation to the file system, executes the specific manipulation on the file system, and transmits, to a cloud storage apparatus, manipulation information which represents the specific manipulation.

12 Claims, 18 Drawing Sheets

(51) Int. Cl.
*G06F 16/13* (2019.01)
*G06F 16/182* (2019.01)
*G06F 16/16* (2019.01)
*G06F 16/18* (2019.01)

(56) References Cited

U.S. PATENT DOCUMENTS

2012/0259813 A1   10/2012  Takata et al.
2015/0358408 A1*  12/2015  Fukatani ............. H04L 67/1097
                                                        709/204

* cited by examiner

Fig. 5

| File system | Updated file path | Manipulation | File system manipulation date/time |
|---|---|---|---|
| Filesystem01 | /A/C -> /B | Migration | 2015/09/12 10:00:00 |

Fig. 6

| File system | Previous synchronization date/time |
|---|---|
| Filesystem01 | 2015/09/12 09:50:00 |
| Filesystem02 | 2015/09/12 12:00:00 |

COMPUTER SYSTEM, FILE STORAGE APPARATUS, AND STORAGE CONTROL METHOD

CROSS-REFERENCE TO RELATED APPLICATIONS

This application is a U.S. National Stage entry of PCT Application No. PCT/JP2015/052621, filed on Jan. 30, 2015, the contents of the foregoing are incorporated by reference.

TECHNICAL FIELD

The present invention relates to a storage apparatus.

BACKGROUND ART

A system is known in which a file storage disposed at each of a plurality of points such as branch offices of a company shares a directory and/or a file via a cloud storage. A user at each point recognizes a storage location of a file based on a directory path in a file system. Therefore, the plurality of file storages must maintain consistency of a directory path.

In order to maintain the consistency of a directory path, a file storage acquires information on a directory manipulation performed at another point and applies the manipulation to its own file system. Due to this process, a directory tree can be synchronized among the plurality of file storages.

PTL 1 describes a first client system changing contents a folder, whereby the change is applied to a synchronized folder of a host system and a second client system acquires a current version of contents of the synchronized folder.

CITATION LIST

Patent Literature

[PTL 1]
U.S. Pat. No. 8,825,597

SUMMARY OF INVENTION

Technical Problem

When a file storage synchronizes data in the file storage with data in a cloud storage, as an amount of change to data made by another file storage increases, the time required to perform a synchronization process also increases. Accordingly, a user may have to wait until the synchronization process is completed.

Solution to Problem

In order to solve the problem described above, a computer system according to an aspect of the present invention includes a plurality of file storage apparatuses and a cloud storage apparatus coupled with the plurality of file storage apparatuses. A file storage apparatus which is one of the plurality of file storage apparatuses stores a file system, and when executing a manipulation of the file system, transmits manipulation information representing the executed manipulation to the cloud storage apparatus. The cloud storage apparatus stores a manipulation history which is a history of the manipulation information. When the file storage apparatus receives a command for a specific manipulation of the file system, a specific apparatus which is any of the file storage apparatuses and the cloud storage apparatus determines, based on a state of the file system and the manipulation history, whether or not an unapplied manipulation affects a target of the specific manipulation, the unapplied manipulation being a manipulation which has been previously executed by another file storage apparatus among the plurality of file storage apparatuses and which has not been applied to the file system. When determination is made that the unapplied manipulation affects the target of the specific manipulation, the file storage apparatus applies the unapplied manipulation to the file system, executes the specific manipulation on the file system, and transmits manipulation information representing the specific manipulation to the cloud storage apparatus.

Advantageous Effects of Invention

In a file storage, access response time to shared data can be reduced.

BRIEF DESCRIPTION OF DRAWINGS

FIG. 5 shows file system manipulation information 209.
FIG. 6 shows previous synchronization date/time information 211.

DESCRIPTION OF EMBODIMENTS

Figure 1:
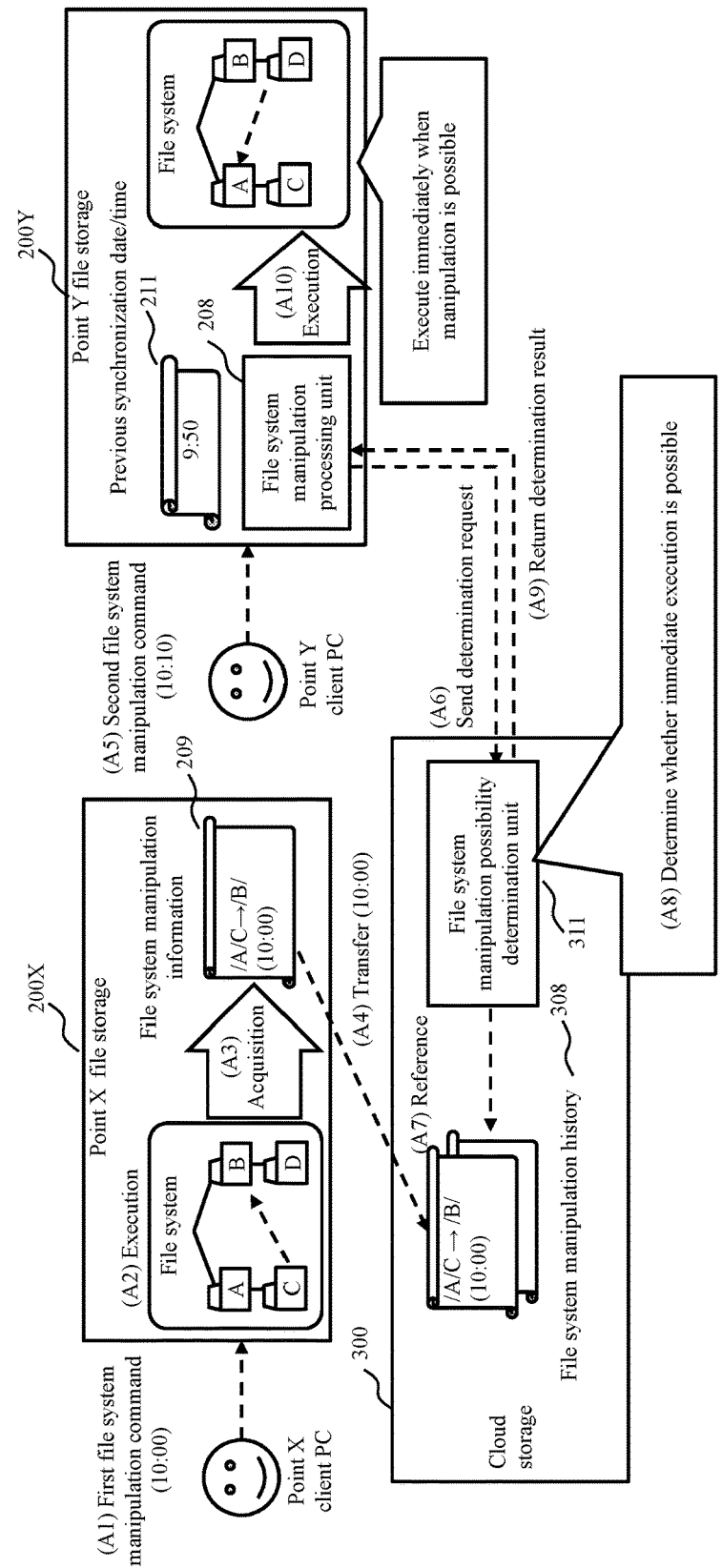
FIG. 1 shows an outline of a first embodiment.

Although information will be described below using expressions such as "xxx information", "xxx history", and "xxx database", information may be expressed using any kind of data structure. In other words, such information can be referred to by other names such as an "xxx table". In addition, in the following description, a configuration of each piece of information is merely an example and one piece of information may be divided into two or more pieces of information and all of or a part of two or more pieces of information may constitute one piece of information.

Furthermore, in the following description, while an ID is used as identification information of an element, other types of identification information may be used in place of, or in addition to, an ID.

In addition, in the following description, when describing elements of a same type without distinguishing the elements from one another, reference signs or a common number in reference signs will be used. However, when describing elements of a same type by distinguishing the elements from one another, reference signs of the elements may be used or IDs assigned to the elements may be used in place of the reference signs of the elements.

In addition, while a "program." is sometimes used as a subject when describing a process in the following description, since a program causes a prescribed process to be performed by appropriately using a storage resource (such as a memory) and/or an interface device (such as a communication port) and the like when being executed by a processor (such as a CPU (Central Processing Unit)), a "processor" may be used instead as a subject of a process. A process described using a program as a subject may be considered a process performed by a processor or by an apparatus including a processor or a system. Furthermore, a processor may include a hardware circuit which performs a part of or all of processing. A program may be installed in an apparatus such as a computer from a program source. The program source may be, for example, a program distribution server or a storage medium that can be read by a computer. When the program source is a program distribution server, the program distribution server may include a processor (for example, a CPU) and a storage resource, and the storage resource may further store a distribution program and a program that is a distribution target. Furthermore, by having the processor of the program distribution server execute the distribution program, the processor of the program distribution server may distribute the program that is the distribution target to other computers. In addition, in the following description, two or more programs may be realized as one program or one program may be realized as two or more programs.

Furthermore, in the following description, a management system may be constituted by one or more computers. Specifically, for example, when a management computer displays information (specifically, for example, when a management computer displays information on its own display device or when the management computer transmits display information to a remote display computer), the management computer constitutes a management system. In addition, for example, when functions identical or similar to those of a management computer are realized by a plurality of computers, the plurality of computers (which may include a display computer when the display computer performs display) constitute a management system. A management computer (for example, a management system) may include an interface device coupled with an I/O system including a display system, a storage resource (for example, a memory), and a processor coupled with the interface device and the storage resource. The display system may be a display device included in the management computer or a display computer coupled with the management computer. The I/O system may be an I/O device (for example, a keyboard and a pointing device or a touch panel) included in the management computer or a display computer or another computer coupled with the management computer. Moreover, a management computer "displaying display information" may signify that display information is displayed on the display system and may be performed by displaying display information on a display device included in the management computer or having the management computer transmit display information to a display computer (in the case of the latter, display information is to be displayed by the display computer). In addition, a management computer inputting or outputting information may signify inputting or outputting information to or from an I/O display device included in the management computer or inputting or outputting information to or from a remote computer (for example, a display computer) being coupled with the management computer. Outputting information may signify displaying information.

First Embodiment

FIG. 1 shows an outline of a first embodiment.

A file storage 200X and a client PC (Personal Computer) 100X coupled with the file storage 200X via an internal network such as a LAN (Local Area Network) are disposed at a point X. In a similar manner, a file storage 200Y and a client PC 100Y coupled with the file storage 200Y via a network are disposed at a point Y. Hereinafter, when the point X and the point Y need not be distinguished from each other, the alphabetical characters in the reference character will be omitted.

A cloud storage 300 is disposed at a data center. The file storage 200 is coupled with the cloud storage 300 via an external network such as a WAN (Wide Area Network).

The file storage 200 stores a file system which includes directories and files as elements. Hereinafter, a manipulation of the file system such as a manipulation of a directory and a manipulation of a file will be referred to as a file system manipulation. The file storage 200 receives a file system manipulation command which is a command for a file system manipulation from a client PC 100, and when the file storage 200 executes the file system manipulation command, the file storage 200 transmits file system manipulation information representing the file system manipulation and an execution date/time thereof to the cloud storage 300. The cloud storage 300 stores file system manipulation information from all of the file storages 200 as a file system manipulation history 308.

The file storage 200 acquires the file system manipulation history 308 under conditions determined in advance, performs a synchronization process of applying an unapplied manipulation history to the file system, the unapplied manipulation history being information on a file system manipulation executed by another file storage 200 but not applied to the file system in the file system manipulation history 308, and stores a time of day of a last synchronization process as a previous synchronization date/time. Examples of the conditions include reception of a file system manipulation command from the client PC and a lapse of a synchronization time interval configured in advance.

Let us assume that, at a time of day 10:00, the client PC 100X issues a first file system manipulation command to the file storage 200X based on an input by a user at the point X (A1). The first file system manipulation command represents a file system manipulation for causing a directory "/A/C/" to migrate to under a directory "/B/". The file storage 200X executes the first file system manipulation command (A2), acquires the executed first file system manipulation command and a time of day thereof as file system manipulation information (A3), and transmits the file system manipulation information to the cloud storage 300 (A4). When the cloud storage 300 receives the file system manipulation information, the cloud storage 300 stores the received file system manipulation information by adding the file system manipulation information to the file system manipulation history 308.

Let us assume that, subsequently, at a time of day 10:10, the client PC 100Y issues a second file system manipulation command to the file storage 200Y based on an input by a user at the point Y (A5). The second file system manipulation command represents a file system manipulation for causing a directory "/B/D/" to migrate to under a directory "/A/". In accordance with the second file system manipulation command, a file system manipulation processing unit 208 in the file storage 200Y transmits a determination request including a previous synchronization date/time 9:50 and the second file system manipulation command to the cloud storage 300 (A6).

A file system manipulation possibility determination unit 311 in the cloud storage 300 refers to the file system manipulation history 308 (A7) and, based on the determination request from the file storage 200Y and on the file system manipulation history 308, determines whether or not the second file system manipulation command can be immediately executed without synchronizing a file system of the file storage 200Y with the file system manipulation history 308 (A8). Subsequently, the file system manipulation possibility determination unit 311 transmits a determination result to the file storage 200Y (A9).

When the determination result indicates that an immediate execution is possible, the file system manipulation processing unit 208 in the file storage 200Y executes the second file system manipulation command (A10). Accordingly, a file system program 213 causes the directory in the file system to migrate. In this example, the first file system manipulation command for causing the directory "/A/C/" to migrate to under the directory "/B/" does not affect the second file system manipulation command for causing the directory "/B/D/" to migrate to under the directory "/A/". Therefore, the file storage 200Y executes the second file system manipulation command without applying the first file system manipulation command to the file system.

Subsequently, when conditions for a synchronization process are satisfied, the file storage 200Y executes the synchronization process to apply the unapplied manipulation history to the file system. In this example, the file storage 200Y applies the first file system manipulation command to the file system.

When the determination result indicates that an immediate execution is impossible, the file system manipulation processing unit 208 acquires file system manipulation information on and after the previous synchronization date/time in the file system manipulation history 308 as the unapplied manipulation history, performs a synchronization process in which file system manipulations in the unapplied manipulation history are applied to the file system in an order of execution, and subsequently executes the second file system manipulation command. In this example, the file storage 200Y applies the first file system manipulation command to the file system and subsequently executes the second file system manipulation command.

While a case in which a file system manipulation is the migration of a directory has been described above, a similar process is also performed when the file system manipulation is a creation, a deletion, and an update of a directory, a creation, a migration, a deletion, and an update of a file, and the like. An update may include a name change. In addition, a file system manipulation of a certain element may include an update of a parent directory of the element. When an element includes metadata and real data, a file system manipulation may be divided into a manipulation of the metadata of the element and a manipulation of the read data of the element.

According to this operation, when it is determined that a file system manipulation command can be immediately executed, since the file storage 200Y does not acquire an unapplied manipulation history and execute a synchronization process, response time by the client PC 100Y can be reduced.

A processing time of a synchronization process includes an acquisition time required by the file storage 200 to acquire an unapplied manipulation history from the cloud storage 300 and an application time required by the file storage 200 to apply the unapplied history to the file system. Therefore, the larger the amount of the unapplied history, the longer the processing time. According to the present embodiment, when it is determined that a file system manipulation command can be immediately executed, the processing time of the synchronization process can be reduced from a response time. In addition, when it is determined that a file system manipulation command cannot be immediately executed, the file storage 200 can collectively acquire the unapplied manipulation history by acquiring the unapplied manipulation history from the cloud storage 300 using the previous synchronization date/time. Accordingly, compared to a case where the file storage 200 acquires one file system manipulation in the cloud storage 300 at a time, the acquisition time can be reduced.

Hereinafter, a configuration of a computer system will be described.

Figure 2:
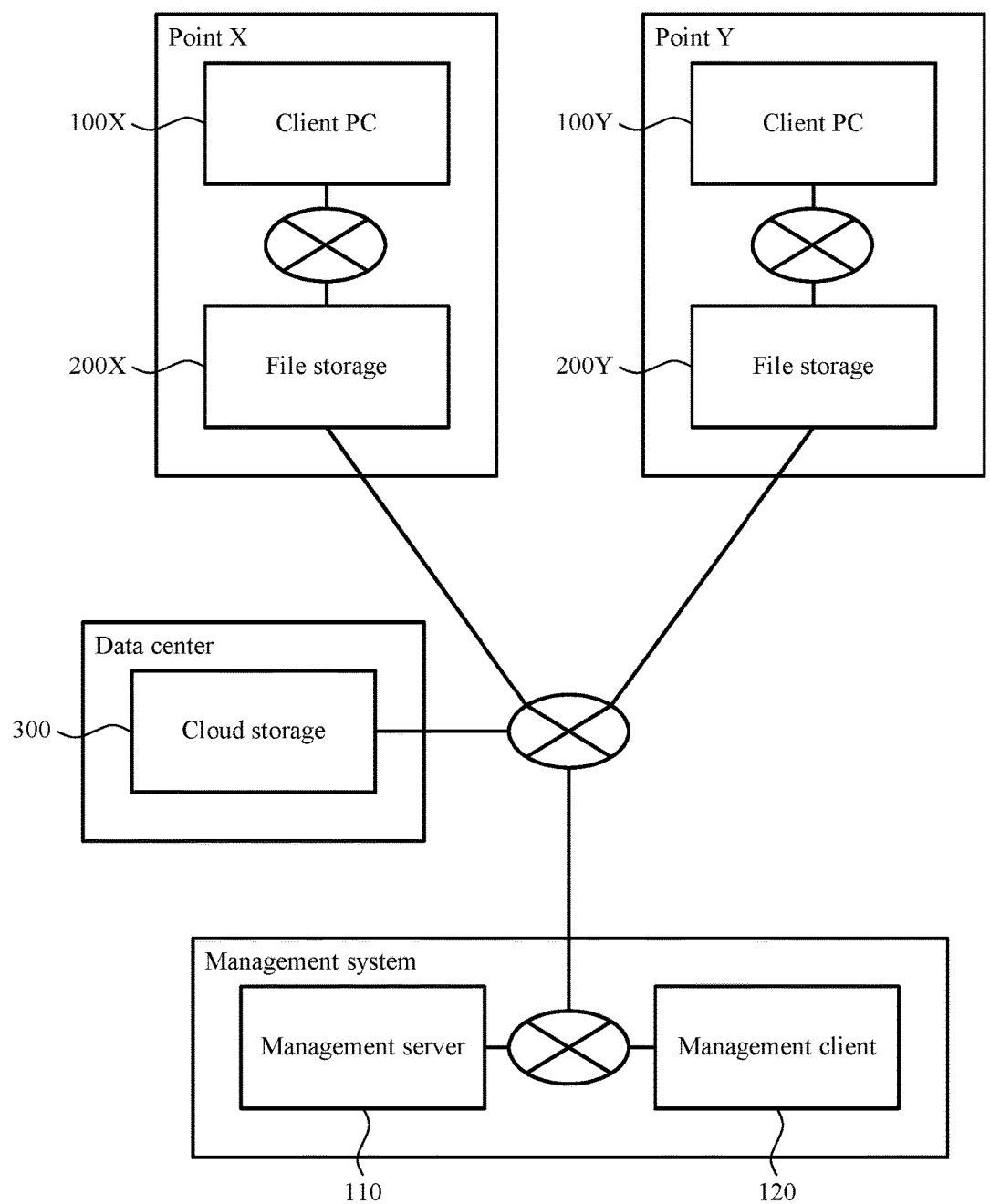
FIG. 2 shows a configuration of a computer system.

FIG. 2 shows a configuration of the computer system.

The computer system includes the client PC 100X, the file storage 200X, the client PC 100Y, the file storage 200Y, the cloud storage 300, a management server 110, and a management client 120. The management server 110 is coupled with the file storages 200X and 200Y and to the cloud storage 300 via an external network such as a WAN. The management client 120 is coupled with the management server 110 via an internal network such as a LAN.

The management client 120 transmits a command to the management server 110 in accordance with an input by a manager. In accordance with the command from the management client 120, the management server 110 causes the management client 120 to display a screen for configuring the computer system. The management server 110 acquires configuration information input to the management client 120 by the manager and, based on the configuration information, transmits an instruction to each unit of the computer system.

Figure 3:
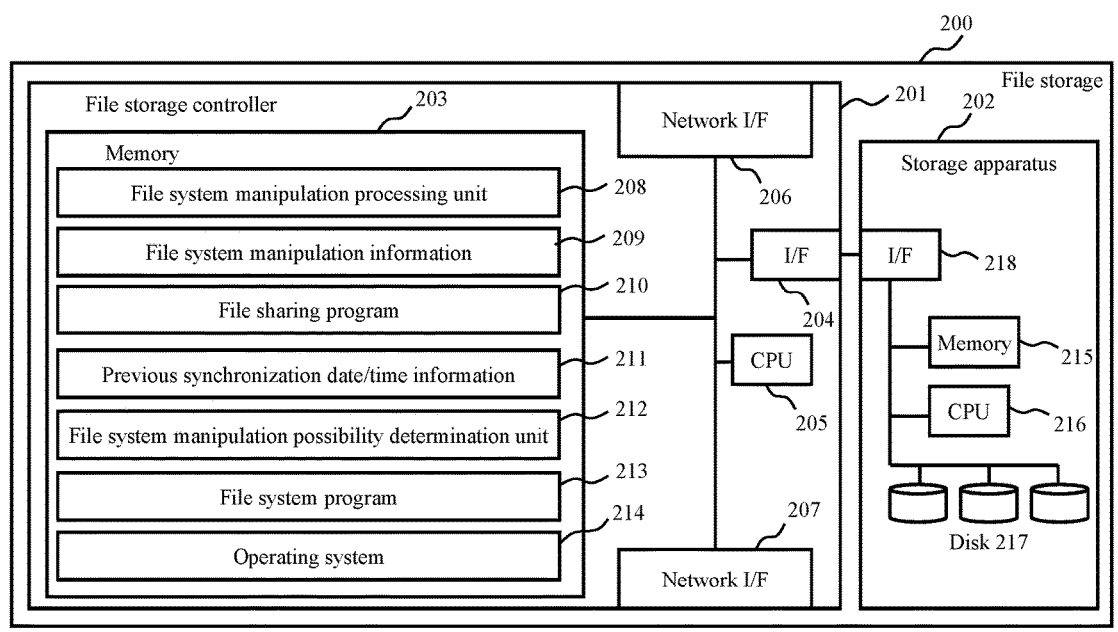
FIG. 3 shows a configuration of a file storage 200.

FIG. 3 shows a configuration of the file storage 200.

The file storage 200 includes a file storage controller 201 and a storage apparatus 202.

The storage apparatus 202 includes a memory 215, a CPU 216, a disk 217, and an I/F 218. The I/F 218 is coupled with the file storage controller 201 and communicates with the file storage controller 201. The memory 215 stores programs and data for controlling the storage apparatus 202. The CPU 216 performs processes such as write and read on the disk 217 in accordance with programs and data in the memory 215. The disk 217 is a non-volatile storage medium such as an HDD (Hard Disk Drive) or an SSD (Solid State Drive). The disk 217 stores directories and files managed by the file system. The disk 217 may be constituted by a plurality of disks.

The file storage controller 201 includes a memory 203, an I/F (Interface) 204, a CPU 205, a network I/F 206, and a network I/F 207. The memory 203 stores programs and data for controlling the file storage 200. The CPU 205 performs processes such as write and read on the storage apparatus 202 in accordance with programs and data in the memory 203. The I/F 204 is coupled with the storage apparatus 202 and communicates with the storage apparatus 202. The network I/F 206 is coupled with the client PC 100 via a LAN and communicates with the client PC 100. The network I/F 207 is coupled with the cloud storage 300 and the management server 110 via a WAN and communicates with the cloud storage 300 and the management server 110.

As programs, the memory 203 stores a file system manipulation processing unit 208, a file sharing program 210, a file system manipulation possibility determination unit 212, a file system program 213, and an operating system 214. Furthermore, as data, the memory 203 stores file system manipulation information 209 and previous synchronization date/time information 211.

Moreover, in the first and third embodiments, the memory 203 does not store the file system manipulation possibility determination unit 212. The file system manipulation possibility determination unit 212 determines, based on a file system manipulation command and a previous synchronization date/time, whether or not an immediate execution of the file system manipulation command is possible.

The file sharing program 210 receives an access from the client PC 100. The file sharing program 210 acquires a file system manipulation command transmitted from the client PC 100 and hands over the file system manipulation command to the file system manipulation processing unit 208. Based on a determination result of a possibility of immediate execution of the file system manipulation command, the file system manipulation processing unit 208 hands over the file system manipulation command or a file system manipulation indicated in the unapplied manipulation history to the file system program 213. The file system program 213 manages a file system and executes a file system manipulation instructed by the file system manipulation processing unit 208. In accordance with the execution of the file system manipulation command, the file system manipulation processing unit 208 further transmits file system manipulation information 209 indicating the file system manipulation command to the cloud storage 300 and hands over a response to the file sharing program 210. The file sharing program 210 further transmits a response to the file system manipulation command to the client PC 100.

Under conditions determined in advance, the file system manipulation processing unit 208 further acquires a file system manipulation history from the cloud storage 300 and hands over the file system manipulation history to the file system program 213. The file system manipulation processing unit 208 saves a previous synchronization date/time representing a time of day at which the file system manipulation history 308 had been applied to the file system in the previous synchronization date/time information 211.

Moreover, in the third and fourth embodiments, under conditions determined in advance, the file system manipulation processing unit 208 transmits directories and files in the file system to the cloud storage 300. In this case, when a specific element in the file system is stubbed or, in other words, when only metadata of the element is stored in the file system and real data of the element is not stored in the file system, under conditions determined in advance, the file system manipulation processing unit 208 acquires real data of a specific version of an object corresponding to the element from the cloud storage 300 and restores the real data in the file system.

The operating system 214 includes a kernel, a driver, and the like. Moreover, the file sharing program 210 and the file system program 213 may be included in the operating system 214. In addition, a file system may be shared among a plurality of points or a directory inside a file system may be shared.

The file storage controller 201 may create a logical volume using the storage apparatus 202 and store a file system in the logical volume or may create a virtual volume using the storage apparatus 202 and store a file system in the virtual volume. In addition, the file storage controller 201 may create a parity group using the plurality of disks 217 and create a logical volume or a virtual volume using the parity group.

Figure 4:
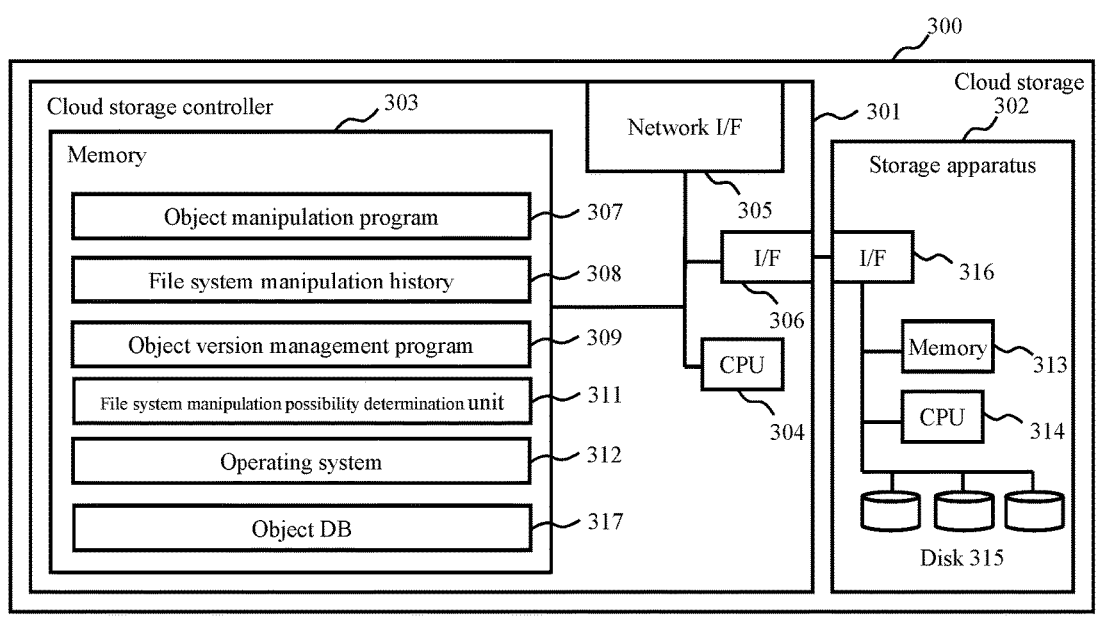
FIG. 4 shows a configuration of a cloud storage 300.

FIG. 4 shows a configuration of the cloud storage 300.

The cloud storage 300 includes a cloud storage controller 301 and a storage apparatus 302.

The storage apparatus 302 includes a memory 313, a CPU 314, a disk 315, and an I/F 316. The I/F 316 is coupled with the cloud storage controller 301 and communicates with the cloud storage controller 301. The memory 313 stores programs and data for controlling the storage apparatus 302. The CPU 314 performs processes such as write and read on the disk 315 in accordance with programs and data in the memory 313. The disk 315 is a non-volatile storage medium such as an HDD or an SSD. The disk 315 stores an object corresponding to an element transmitted from the file storage 200. The disk 315 may be constituted by a plurality of disks.

The cloud storage controller 301 includes a memory 303, a CPU 304, a network I/F 305, and an I/F 306. The memory 303 stores programs and data for controlling the cloud storage 300. The CPU 304 performs processes such as write and read on the storage apparatus 302 in accordance with programs and data in the memory 303. The I/F 306 is coupled with the storage apparatus 302 and communicates with the storage apparatus 302. The network I/F 305 is coupled with the file storage 200 via a WAN and communicates with the file storage 200.

As programs, the memory 303 stores an object manipulation program 307, an object version management program 309, a file system manipulation possibility determination unit 311, and an operating system 312. Furthermore, as data, the memory 303 stores a file system manipulation history 308 and an object DB (database) 317.

The object manipulation program 307 receives an access from the file storage 200. The object manipulation program 307 receives file system manipulation information from the file storage 200, saves the file system manipulation information in the file system manipulation history 308, and transmits a response to the file storage 200. The file system manipulation possibility determination unit 311 determines, in accordance with a determination request from the file storage 200, whether or not an immediate execution of a file system manipulation command is possible, and transmits a responsive representing a determination result to the file storage 200. The operating system 312 includes a kernel, a driver, and the like.

The object manipulation program 307 receives an element of a file system from the file storage 200 and hands over the element to the object version management program 309. The object version management program 309 saves the received element as an object in the object DB 317.

In the third and fourth embodiments, the object version management program 309 manages a version of an object and, when a restoration data request including an object ID and a version is received from the file storage 200, returns real data of the designated object ID and version.

The cloud storage controller 301 may create a logical volume using the storage apparatus 302 and store an object in the logical volume or may create a virtual volume using the storage apparatus 302 and store an object in the virtual volume. In addition, the cloud storage controller 301 may create a parity group using the plurality of disks 217 and create a logical volume or a virtual volume using the parity group.

FIG. 5 shows the file system manipulation information 209.

The file system manipulation information 209 includes a file system 601, an updated file path 602, a manipulation 603, and a file system manipulation date/time 604. The file system 601 is a portion indicating a name of a file system being shared among a plurality of points in a path indicating a manipulation target indicated in a file system manipulation command received from the client PC 100. The file system name may be a name of a directory shared among a plurality of points. The updated file path 602 is a portion indicating a hierarchical level under the file system name in the path indicating the manipulation target and identifies a directory or a file that is the manipulation target. The manipulation 603 indicates a type of a file system manipulation indicated in the file system manipulation command. The file system manipulation date/time 604 indicates a time of day at which the file system manipulation had been executed.

FIG. 6 shows the previous synchronization date/time information 211.

The previous synchronization date/time information 211 has an entry for each file system in the file storage 200. An entry of one file system includes a file system 501 and a previous synchronization date/time 502. The file system 501 indicates a name of the file system. The previous synchronization date/time 502 represents a time of day at which the file system had been last synchronized with the file system manipulation history.

Figure 7:
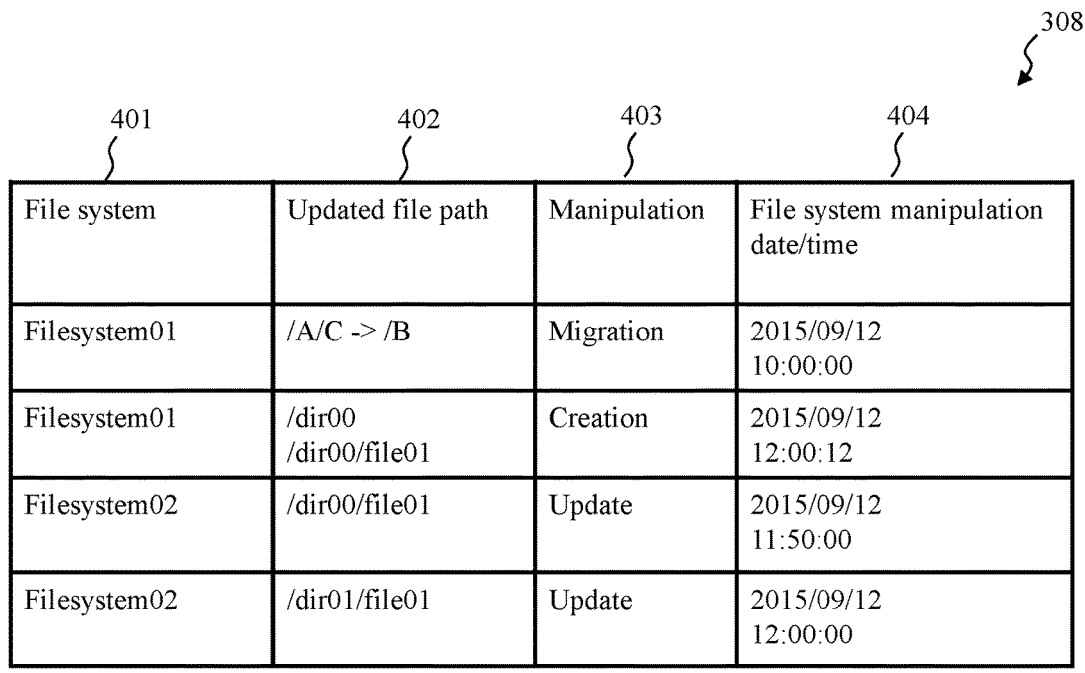
FIG. 7 shows a file system manipulation history 308.

FIG. 7 shows the file system manipulation history 308.

The file system manipulation history 308 has an entry for each piece of file system manipulation information received from the plurality of file storages 200. One entry includes a file system 401, an updated file path 402, a manipulation 403, and a file system manipulation date/time 404. These fields are respectively similar to the file system 601, the updated file path 602, the manipulation 603, and the file system manipulation date/time 604 in the file system manipulation information 209.

Moreover, information indicating an order of manipulation such as an entry number may be used in place of the file system manipulation date/time.

Figure 8:
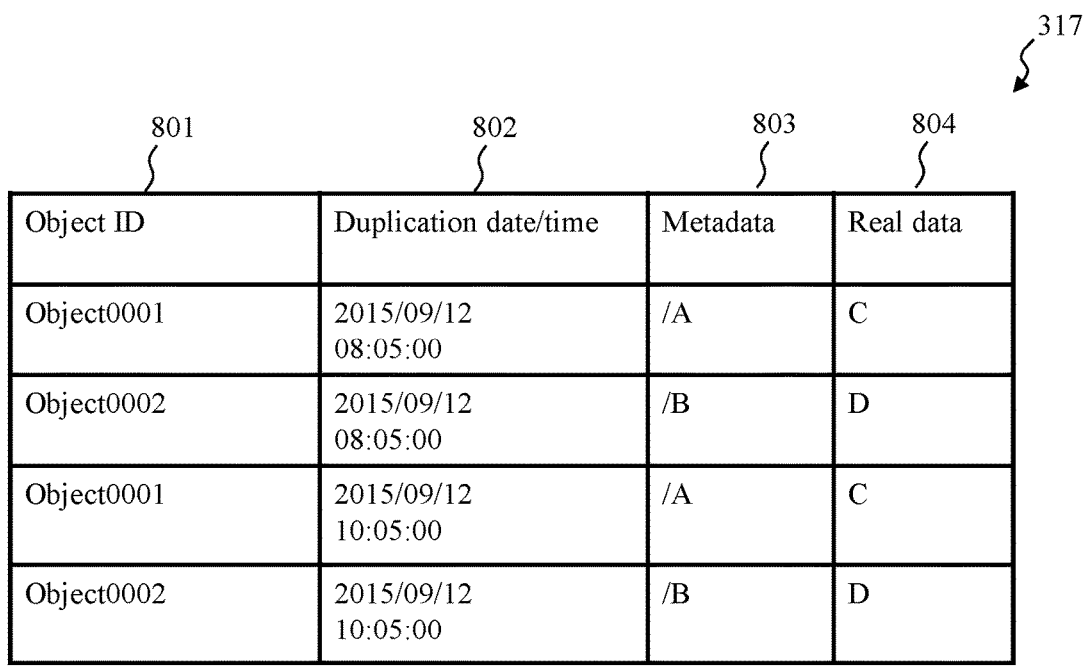
FIG. 8 shows an object DB 317.

FIG. 8 shows the object DB 317.

The object DB 317 includes an entry for each object and for each version. One entry includes an object ID 801, a duplication date/time 802, metadata 803, and real data 804. The object ID 801 is an identifier indicating an object. The duplication date/time 802 is a time of day at which the real data of the object had been transmitted from the file storage 200 and represents a version of the object. The metadata 803 indicates the metadata of the object and includes a path of the object. The real data 804 indicates the real data of the object. When the object is a directory, for example, the real data 804 is an object ID of a child object existing under the object. When the object is a file, for example, the real data 804 is data of the file. Moreover, an identifier, a number, or the like indicating a version may be used in place of the duplication date/time.

The cloud storage 300 may transmit, to the file storage 200, an object ID of an object transmitted from the file storage 200, and the file storage 200 may store conversion information associating each of the directories and files in the file system with the object ID.

Moreover, while the cloud storage 300 according to the present embodiment manages an element of a file system as an object, an element of a file system may be managed as a file system similar to the file storage 200.

Hereinafter, operations of the computer system will be described.

Figure 9:
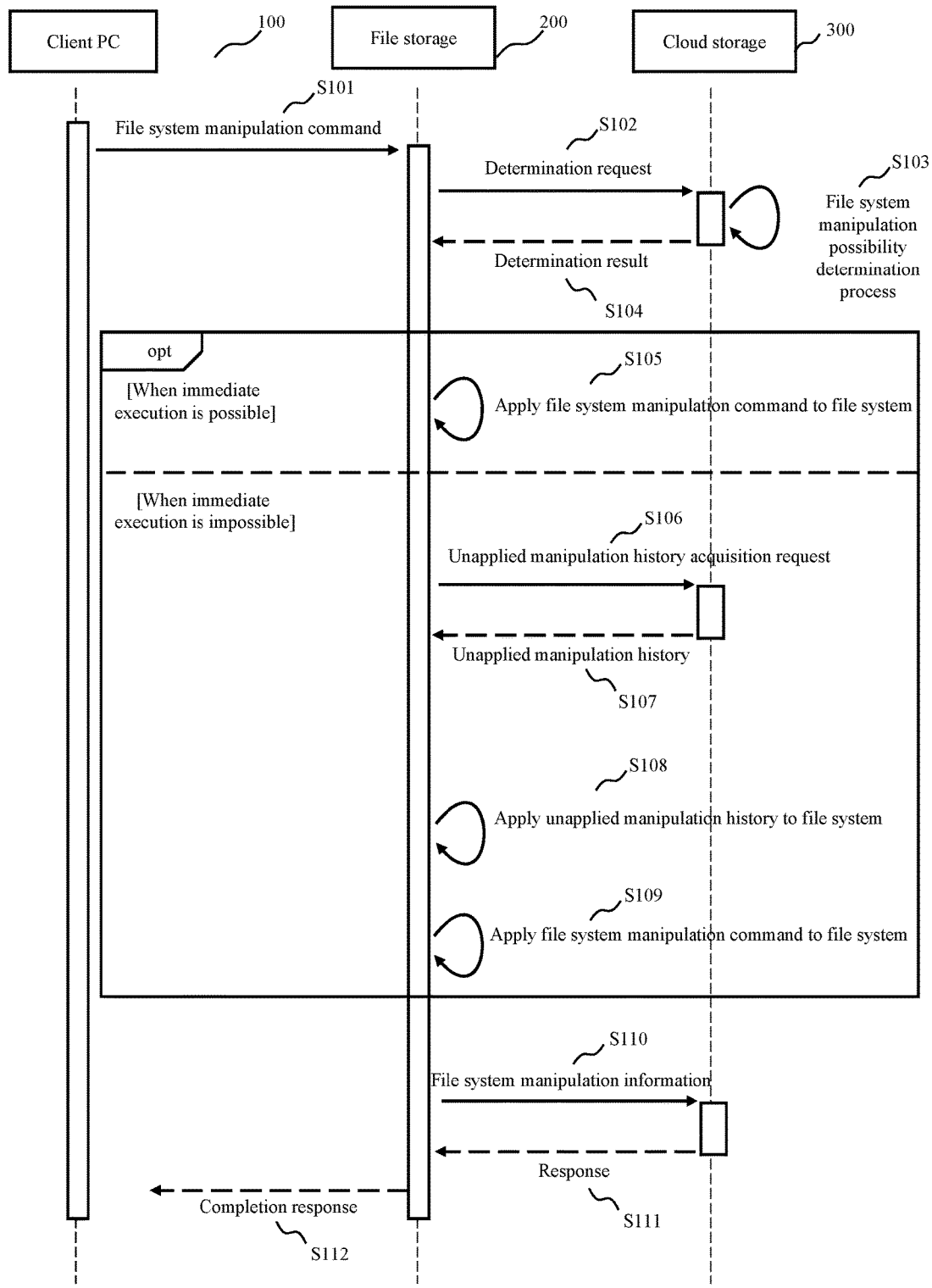
FIG. 9 is a sequence diagram showing operations of a computer system according to the first embodiment.

FIG. 9 is a sequence diagram showing operations of the computer system according to the first embodiment.

This sequence diagram shows operations of the client PC 100, the file storage 200, and the cloud storage 300.

The client PC 100 issues a file system manipulation command to the file storage 200 in accordance with an input from a user or batch processing configured in advance (S101). The file storage 200 having received the file system manipulation command issues a determination request including the acquired file system manipulation command and a previous synchronization date/time to the cloud storage 300 (S102).

The cloud storage 300 having received the determination request determines whether or not the file system manipulation command can be immediately executed (S103) and, as a response, transmits a determination result to the file storage 200 (S104).

When the received determination result indicates that an immediate execution is possible, the file storage 200 executes the file system manipulation command (S105), and causes the process to migrate to S110.

When the received determination result indicates that an immediate execution is impossible, the file storage 200 issues an unapplied manipulation history acquisition request to the cloud storage 300 (S106). The cloud storage 300 having received the unapplied manipulation history acquisition request selects file system manipulation information on and after the previous synchronization date/time in the file system manipulation history 308 as an unapplied manipulation history and, as a response, transmits the unapplied manipulation history to the file storage 200 (S107). The file storage 200 having received the unapplied manipulation history applies the unapplied manipulation history to the file system (S108), executes the file system manipulation command (S109), and causes the process to migrate to S110.

After S105 or S109, the file storage 200 transmits the file system manipulation information 209 including the executed file system manipulation command and a time of day of issuance thereof to the cloud storage 300 (S110). The cloud storage 300 having received the file system manipulation information adds the file system manipulation information to the file system manipulation history 308, and transmits a response indicating completion of the addition of the file system manipulation information to the file storage 200 (S111). The file storage 200 having received the response transmits a response indicating completion of the file system manipulation command to the client PC 100 (S112), and ends the present sequence.

According to the sequence, the file storage 200 can cause the cloud storage 300 to determine whether or not an immediate execution of a file system manipulation command is possible. When it is determined that an immediate execution of the file system manipulation command is possible, the file storage 200 can immediately execute the file system manipulation command without applying a file system manipulation history to a file system. As a result, response time of the client PC 100 is reduced.

After the sequence, when executing a subsequent periodical synchronization process or when receiving a subsequent file system manipulation command and determining that an immediate execution thereof is impossible, the file storage 200 applies the unapplied manipulation history to the file system. By performing a periodical synchronization process, an increase in an amount of the unapplied manipulation history can be prevented.

Alternatively, when it is determined that an immediate execution of the file system manipulation command is possible, the file storage 200 may execute the synchronization process after executing the file system manipulation command.

Moreover, in S104, when the file system manipulation possibility determination unit 311 determines that an immediate execution is impossible, the unapplied manipulation history may be transmitted to the file storage 200 together with a determination result. In this case, S106 and S107 are no longer necessary.

Figure 10:
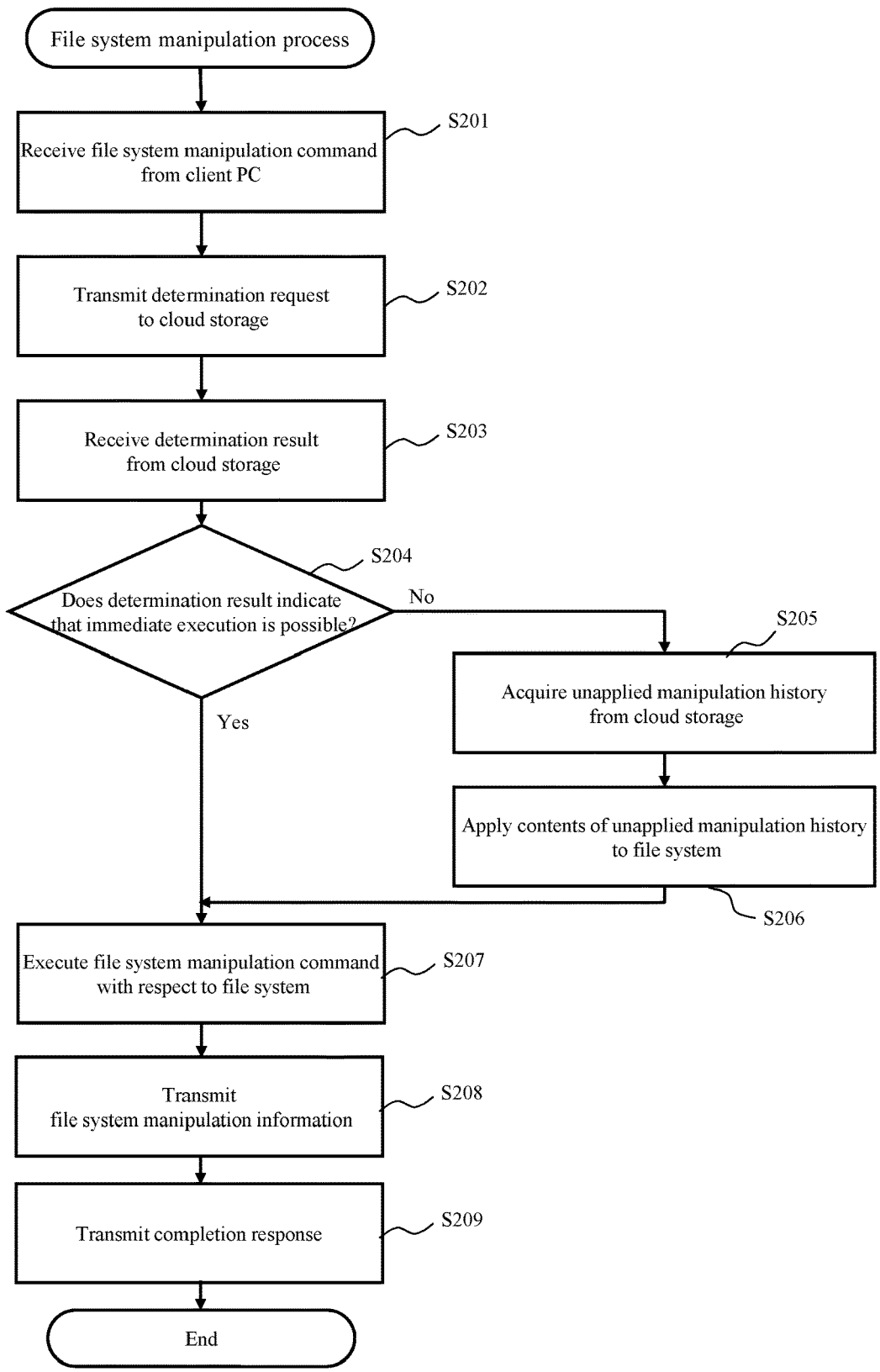
FIG. 10 is a flow chart representing a file system manipulation process.

FIG. 10 is a flow chart representing a file system manipulation process.

When the file system manipulation processing unit 208 receives a file system manipulation command with respect to a target file system from the client PC 100, the file system manipulation processing unit 208 starts a file system manipulation process (S201). Subsequently, the file system manipulation processing unit 208 acquires a previous synchronization date/time of the target file system from the previous synchronization date/time information 211, and issues a determination request including the acquired previous synchronization date/time and the file system manipulation command to the file system manipulation possibility determination unit 311 of the cloud storage 300 (S202).

Subsequently, the file system manipulation processing unit 208 receives a determination result from the file system manipulation possibility determination unit 311 (S203).

Subsequently, the file system manipulation processing unit 208 determines whether or not the determination result indicates that an immediate execution is possible (S204). When the determination result indicates that an immediate execution is possible (S204: Yes), the file system manipulation processing unit 208 causes the process to migrate to S207. When the determination result indicates that an immediate execution is impossible (S204: No), by transmitting a file system manipulation history acquisition request to the cloud storage 300, the file system manipulation processing unit 208 acquires an unapplied manipulation history representing entries on and after the previous synchronization date/time in the file system manipulation history 308 from the cloud storage 300 (S205). Subsequently, the file system manipulation processing unit 208 applies the unapplied manipulation history to the file system (S206), and causes the process to migrate to S207.

After Yes in S204 or after S206, the file system manipulation processing unit 208 executes the file system manipulation command on the target file system (S207). Subsequently, the file system manipulation processing unit 208 transmits the file system manipulation information 209 including the executed file system manipulation command and a time of day of issuance thereof to the cloud storage 300 (S208). The file storage 200 having received the response from the cloud storage 300 transmits a completion response of the file system manipulation command to the client PC 100 (S209), and ends the present flow.

According to the file system manipulation process, when it is determined that an immediate execution of a file system manipulation command is possible, the file storage 200 can immediately execute the file system manipulation command. In addition, when it is determined that an immediate execution of the file system manipulation command is impossible, the file storage 200 can apply an unapplied manipulation history to the file system and execute the file system manipulation command. Accordingly, a file system can be synchronized among a plurality of file storages 200. Furthermore, the file storage 200 can acquire information on a manipulation which has been executed by another file storage 200 and which is not applied to the file system in the file system manipulation history 308 as the unapplied manipulation history.

Moreover, the file storage 200 may start a file system manipulation process when the management server 110, the file storage 200, or the like issues a file system manipulation command configured in advance at a time of day configured in advance by batch processing or the like.

Figure 11:
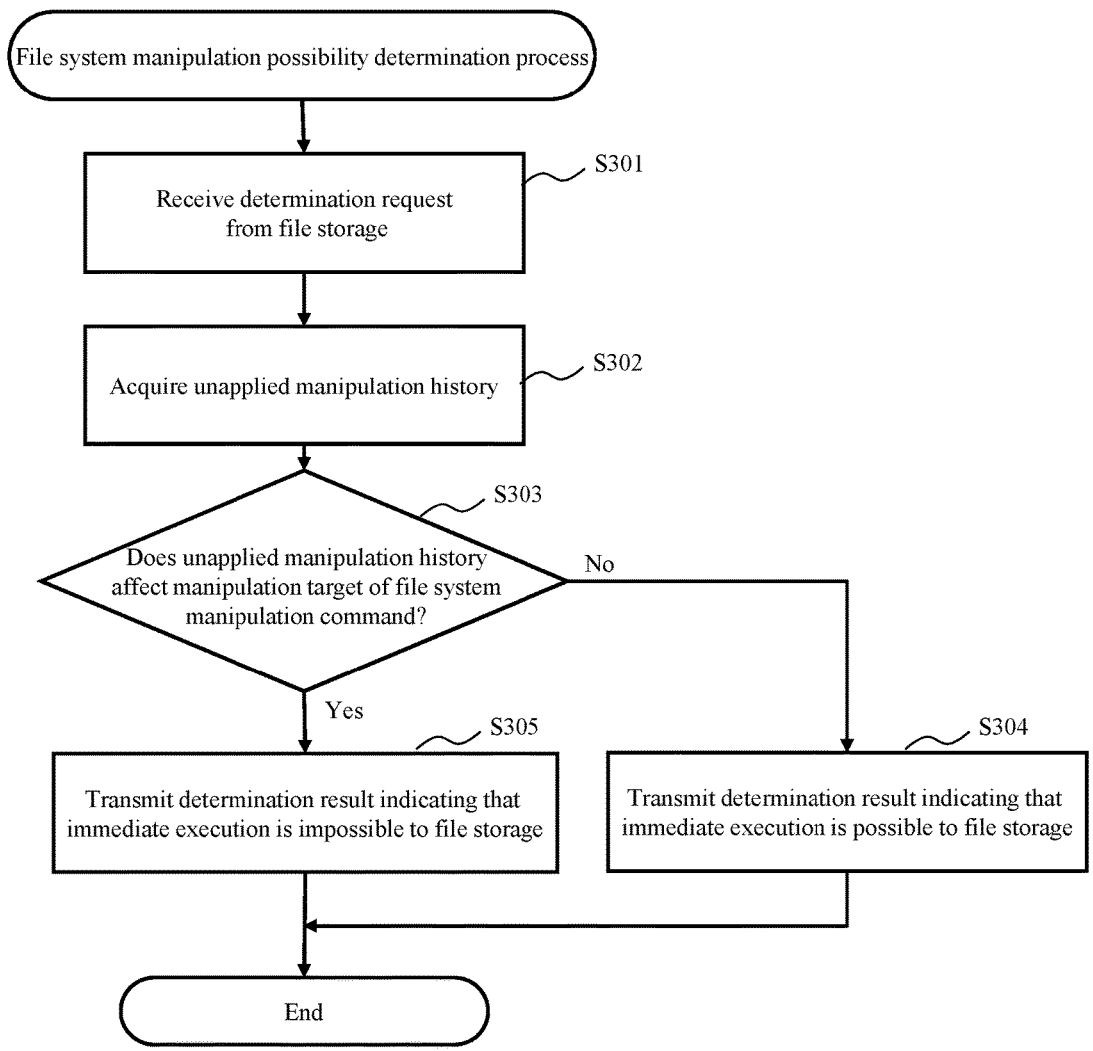
FIG. 11 is a flow chart representing a file system manipulation possibility determination process.

FIG. 11 is a flow chart representing a file system manipulation possibility determination process.

When the file system manipulation possibility determination unit 311 receives a determination request from the file system manipulation processing unit 208, the file system manipulation possibility determination unit 311 starts a file system manipulation possibility determination process (S301). The determination request includes a previous synchronization date/time and a file system manipulation command. Subsequently, the file system manipulation possibility determination unit 311 selects entries on and after the previous synchronization date/time from the file system manipulation history 308 as an unapplied manipulation history (S302).

The file system manipulation possibility determination unit 311 determines whether or not the unapplied manipulation history affects a manipulation target of the file system manipulation command (S303). The manipulation target is a directory or a file designated by the file system manipulation command and, when the file system manipulation command is for a migration, includes a migration source and a migration destination. When a path of the manipulation target differs between prior to execution of the unapplied manipulation history and after the execution of the unapplied manipulation history, the file system manipulation possibility determination unit 311 determines that the unapplied manipulation history affects the manipulation target.

A specific example of the determination method in S303 will be described. The file system manipulation possibility determination unit 311 first determines whether or not the unapplied manipulation history includes a file system manipulation command which changes a path of the manipulation target. A file system manipulation command which changes the path of the manipulation target is a file system manipulation command including a change to any of a directory of the manipulation target and a directory above the manipulation target.

When the unapplied manipulation history does not include a file system manipulation command which changes the path of the manipulation target, the file system manipulation possibility determination unit 311 determines that the unapplied manipulation history does not affect the manipulation target. When the unapplied manipulation history includes a file system manipulation command which changes the path of the manipulation target, the file system manipulation possibility determination unit 311 determines, for each of the file system manipulation commands which change the path of the manipulation target in the unapplied manipulation history, whether or not entries subsequent to the file system manipulation command include a file system manipulation command which revert the change. When it is determined that, for each of the file system manipulation commands which change the path of the manipulation target, the entries subsequent to the file system manipulation command include a file system manipulation command which revert the change, the file system manipulation possibility determination unit 311 determines that the unapplied manipulation history does not affect the manipulation target.

When it is determined that, for each of the file system manipulation commands which change the path of the manipulation target, the entries subsequent to the file system manipulation command do not include a file system manipulation command which revert the change, the file system manipulation possibility determination unit 311 determines that the unapplied manipulation history affects the manipulation target.

When it is determined that the unapplied manipulation history affects the manipulation target (S303: Yes), the file system manipulation possibility determination unit 311 returns a determination result indicating that an immediate execution is impossible to the file system manipulation processing unit 208 (S305), and ends the present flow. When it is determined that the unapplied manipulation history does not affect the manipulation target (S303: No), the file system manipulation possibility determination unit 311 returns a determination result indicating that an immediate execution is possible to the file system manipulation processing unit 208 (S304), and ends the present flow.

According to the file system manipulation possibility determination process, the cloud storage 300 can determine whether or not an immediate execution of a file system manipulation is possible by determining whether or not an unapplied manipulation history affects a manipulation target. In addition, when a path of the manipulation target changes between before and after the application of the unapplied manipulation history, the cloud storage 300 can determine that the unapplied manipulation history affects the manipulation target. Furthermore, when the unapplied manipulation history includes a file system manipulation to change the path of the manipulation target but does not include a file system manipulation to revert the change after the file system manipulation to change the path, the cloud storage 300 can determine that the unapplied manipulation history affects the manipulation target.

The file storage 200 can return an error to the client PC 100 when a manipulation target does not exist and the like.

Figure 12:
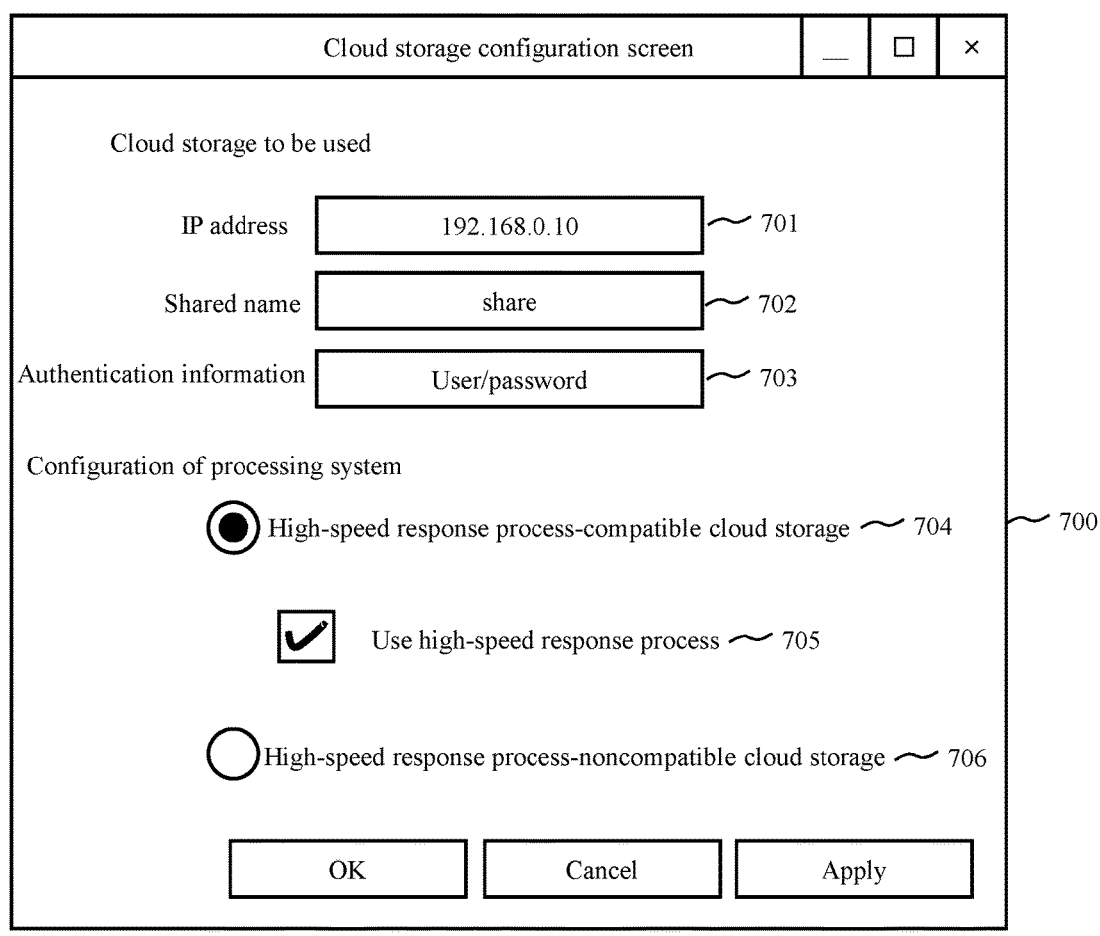
FIG. 12 shows a cloud storage configuration screen.

FIG. 12 shows a cloud storage configuration screen.

When the management server 110 receives a command for configuring the cloud storage 300 from the management client 120, the management server 110 causes the management client 120 to display a cloud storage configuration screen.

The cloud storage configuration screen includes an IP address input field 701, a shared name input field 702, an authentication information input field 703, a high-speed response process-compatible cloud storage selection button 704, a high-speed response process use check box 705, a high-speed response process-noncompatible cloud storage selection button 706, an OK button 707, a cancel button 707, and an apply button 708. The high-speed response process-compatible cloud storage selection button 704 and the high-speed response process-noncompatible cloud storage selection button 706 constitute a radio button in which only one of the selection buttons is turned ON. In this description, when an immediate execution of a file system manipulation command is possible, a process of immediately executing the file system manipulation command will be referred to as a high-speed response process.

An IP address of the cloud storage 300 is input to the IP address input field 701. A shared name of the cloud storage 300 is input to the shared name input field 702. Authentication information of a user in the cloud storage 300 is input to the authentication information input field 703. Authentication information is, for example, a user name and a password. The high-speed response process-compatible cloud storage selection button 704 being turned ON indicates that the cloud storage 300 supports the high-speed response process and the high-speed response process use check box 705 is enabled. The high-speed response process use check box 705 being turned ON indicates that the cloud storage 300 is to execute the high-speed response process. The high-speed response process-noncompatible cloud storage selection button 706 being turned ON indicates that the high-speed response process is not supported.

When the OK button 707 is pressed, the management client 120 transmits a value input to the cloud storage configuration screen to the management server 110 and closes the cloud storage configuration screen. When the cancel button 707 is pressed, the management client 120 closes the cloud storage configuration screen without transmitting the value input to the cloud storage configuration screen to the management server 110. When the apply button 708 is pressed, the management client 120 transmits the value input to the cloud storage configuration screen to the management server 110 and maintains the cloud storage configuration screen.

When the management server 110 receives the value input to the cloud storage configuration screen from the management client 120, the management server 110 configures the received value to the plurality of file storages 200. Accordingly, the plurality of file storages 200 are able to use the cloud storage 300. In addition, the plurality of file storages 200 are able to recognize whether or not the cloud storage 300 is to perform the high-speed response process.

Second Embodiment

Figure 13:
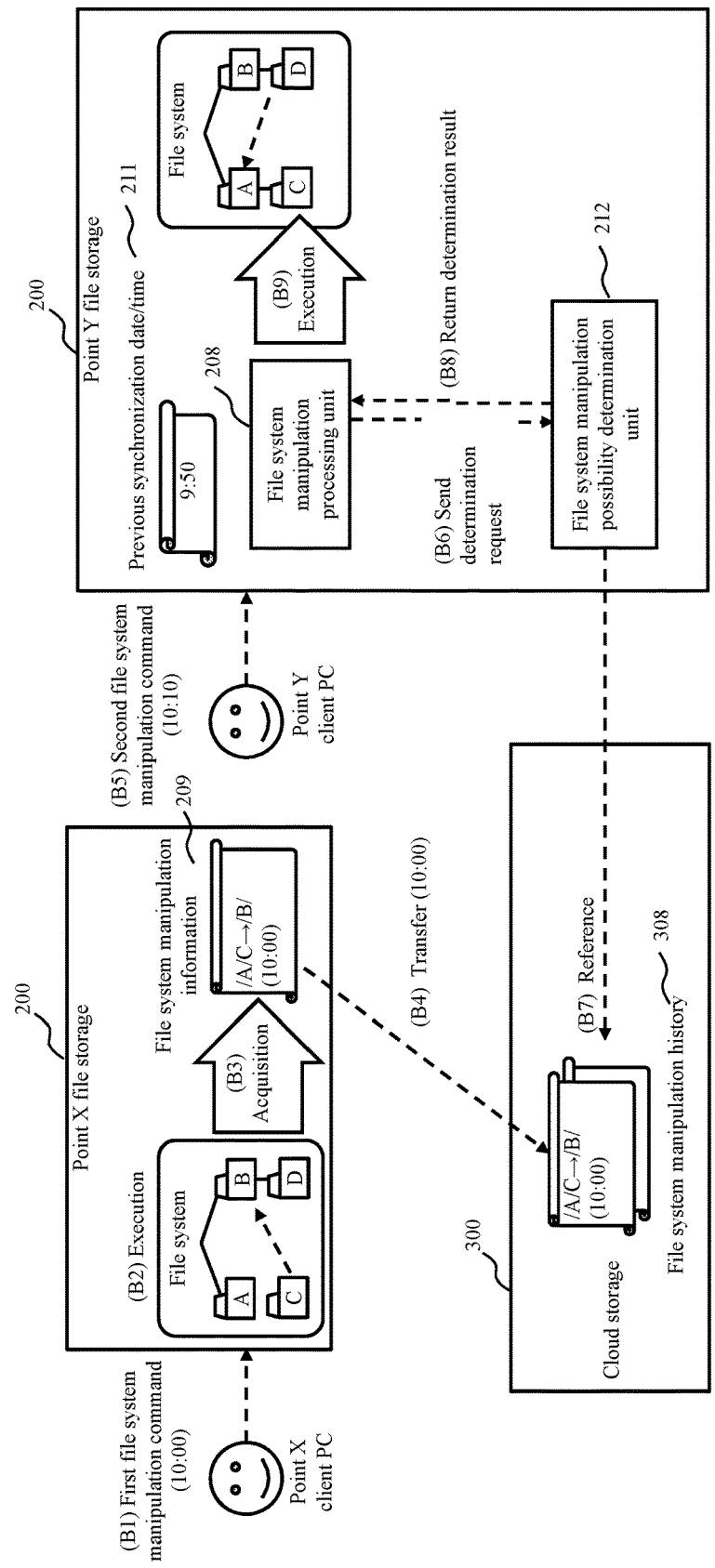
FIG. 13 shows an outline of a second embodiment.

FIG. 13 shows an outline of a second embodiment.

In comparison to the first embodiment, in the second embodiment, the cloud storage 300 does not include the file system manipulation possibility determination unit 311 but the file storage 200 includes a file system manipulation possibility determination unit 212 which is similar to the file system manipulation possibility determination unit 311. Hereinafter, differences from the first embodiment will be mainly described.

B1 to B5 are respectively similar to A1 to A5 in the first embodiment.

In accordance with a second file system manipulation command in B5, the file system manipulation processing unit 208 in the file storage 200Y hands over a determination request including a previous synchronization date/time and the second file system manipulation command to the file system manipulation possibility determination unit 212 (B6). The file system manipulation possibility determination unit 212 refers to an unapplied manipulation history in the cloud storage 300, determines whether or not the second file system manipulation command can be immediately executed (B7), and returns a determination result to the file system manipulation processing unit 208 (B8).

When the determination result indicates that an immediate execution is possible, the file system manipulation processing unit 208 executes the second file system manipulation command (B9).

When the determination result indicates that an immediate execution is impossible, the file system manipulation processing unit 208 performs a synchronization process for applying the unapplied manipulation history to a file system and subsequently executes the second file system manipulation command.

According to the operation, even when the cloud storage 300 does not include the file system manipulation possibility determination unit 311, the file system manipulation possibility determination unit 212 in the file storage 200 can determine whether or not a file system manipulation command can be immediately executed. As a result, the present invention can be applied without significantly changing the cloud storage 300. In addition, when it is determined that a file system manipulation command can be immediately executed, a response time can be reduced since an application time is no longer required.

Figure 14:
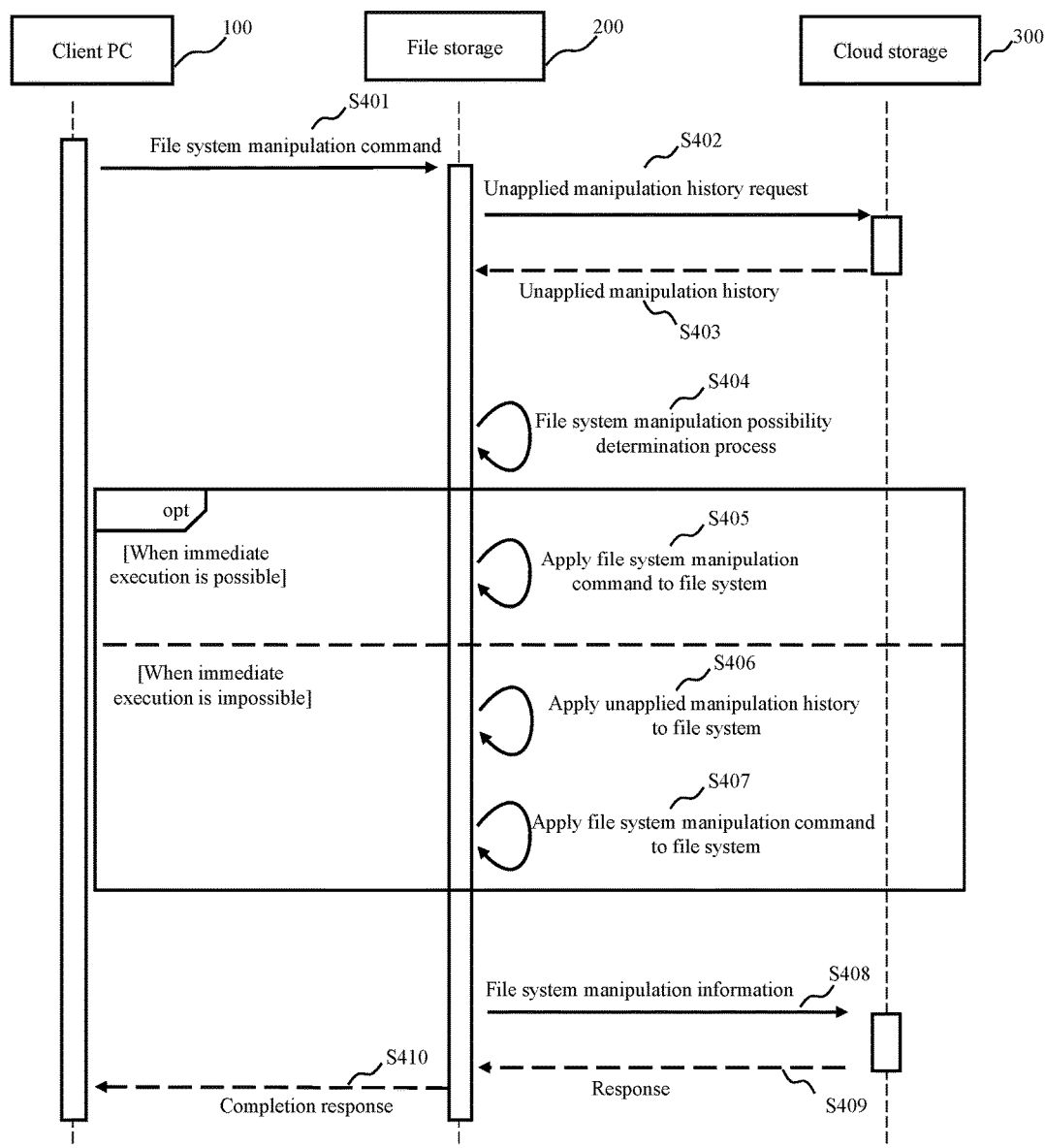
FIG. 14 is a sequence diagram showing operations of a computer system according to the second embodiment.

FIG. 14 is a sequence diagram showing operations of a computer system according to the second embodiment.

The client PC 100 issues a file system manipulation command to the file storage 200 in a similar manner to S101 (S401). The file system manipulation processing unit 208 in the file storage 200 having received the file system manipulation command issues a history request including a previous synchronization date/time to the cloud storage 300 (S402). The cloud storage 300 having received the history request selects an unapplied manipulation history based on the previous synchronization date/time and transmits the unapplied manipulation history to the file storage 200 (S403). The file system manipulation possibility determination unit 212 in the file storage 200 having received the unapplied manipulation history determines, based on the unapplied manipulation history, whether or not the file system manipulation command can be immediately executed (S404).

When the determination result indicates that an immediate execution is possible, the file system manipulation processing unit 208 executes the file system manipulation command (S405), and causes the process to migrate to S408.

When the determination result indicates that an immediate execution is impossible, the file system manipulation processing unit 208 applies the unapplied manipulation history to the file system (S406), executes the file system manipulation command (S407), and causes the process to migrate to S408.

S408 to S410 after S405 or S407 are respectively similar to S110 to S112 in the first embodiment.

According to the sequence, the file storage 200 can determine whether or not an immediate execution of a file system manipulation command is possible. When it is determined that an immediate execution of the file system manipulation command is possible, the file storage 200 can immediately execute the file system manipulation command without applying a file system manipulation history to a file system. As a result, response time of the client PC 100 is reduced.

Third Embodiment

Figure 15:
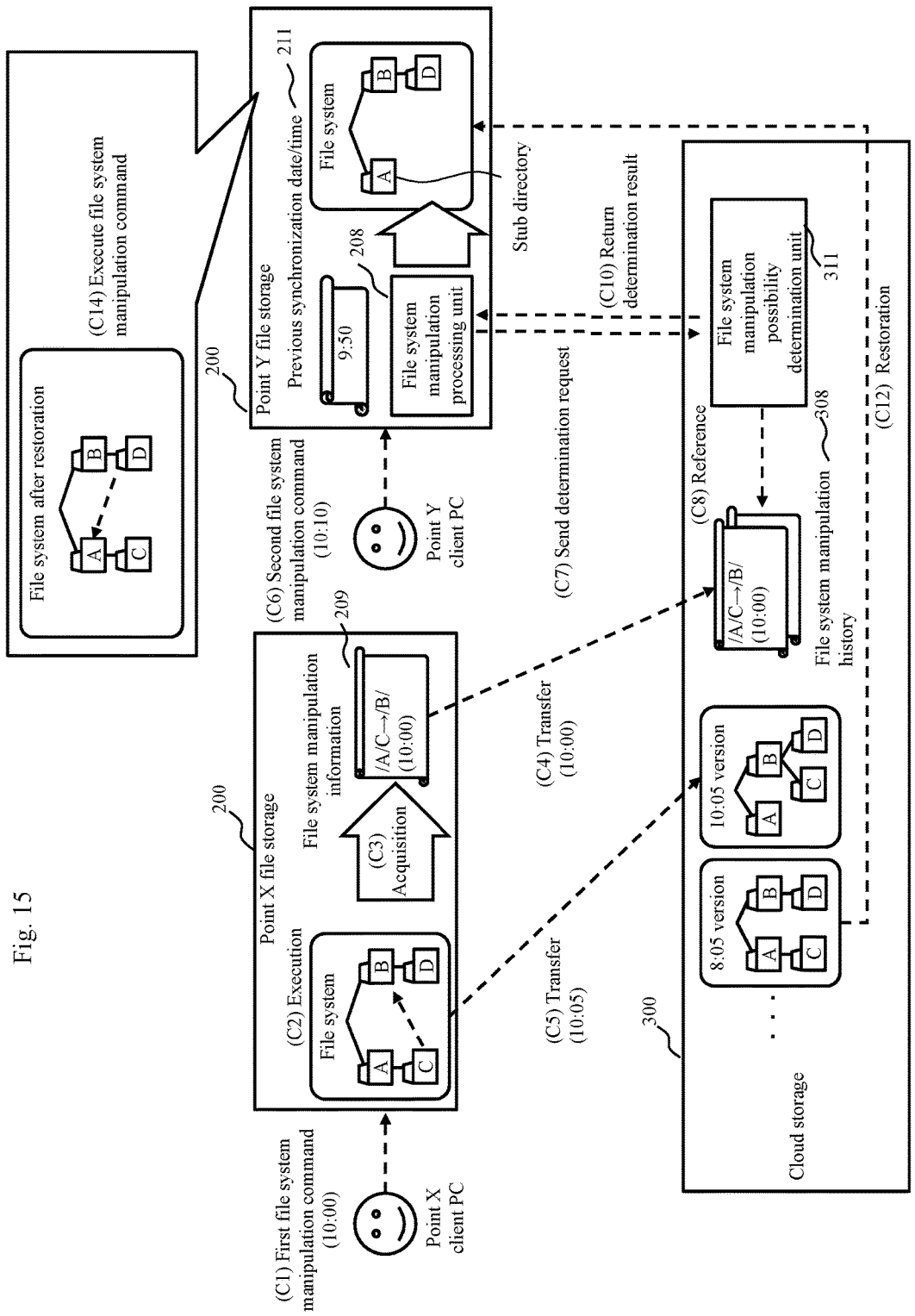
FIG. 15 shows an outline of a third embodiment.

FIG. 15 shows an outline of a third embodiment.

In comparison to the first embodiment, in the third embodiment, the file storage 200 transfers real data of a file system to the cloud storage 300 at a time of day configured in advance or in response to a request from a management system, and the cloud storage 300 stores the real data of the file system for each version. Hereinafter, differences from the first embodiment will be mainly described.

The file storage 200 according to the present embodiment stubs and stores an element satisfying stub conditions determined in advance in the file system. The stubbed element does not include real data and only includes metadata. The stub conditions of an element in the file storage 200 are that the element has not been accessed by the file storage 200 after being created at another point, the element has not been accessed by the file storage 200 for a long period of time, or the like. The metadata may include an object ID. The cloud storage 300 stores real data of all objects. When the file storage 200 accesses a stubbed element, by executing restoration of the element, the file storage 200 acquires real data of the element from the cloud storage 300 and restores the real data of the element in the file system.

At a time of day 8:05 configured in advance, the file storage 200X transfers real data of a file system to the cloud storage 300. Accordingly, real data of the file system at the time of day 8:05 is stored in the cloud storage 300. While the real data in the cloud storage 300 is expressed in the form of a file system in this case, the real data is stored in the form of the object DB 317.

C1 to C4 are respectively similar to A1 to A4 in the first embodiment.

At a time of day 10:05 configured in advance, the file storage 200X transfers real data of the file system to the cloud storage 300 (C5). Accordingly, real data of the file system at the time of day 10:05 is stored in the cloud storage 300.

Let us assume that, at the time of day 10:10, the client PC 100Y issues a second file system manipulation command to the file storage 200Y based on an input by a user at the point Y (C6). In this case, a directory A is assumed to be a stub directory. In other words, the file system does not include information on child elements of the directory A. In accordance with the second file system manipulation command, the file system manipulation processing unit 208 in the file storage 200Y transmits a determination request including a previous synchronization date/time and the second file system manipulation command to the cloud storage 300 (C7). Based on the determination request, the file system manipulation possibility determination unit 311 in the cloud storage 300 refers to the file system manipulation history 308 and determines whether or not the second file system manipulation command can be immediately executed (C8). Subsequently, the file system manipulation possibility determination unit 311 transmits a determination result to the file storage 200Y (C10).

Subsequently, the file system manipulation processing unit 208 in the file storage 200Y acquires real data of a latest version preceding the previous synchronization date/time which is a manipulation target of the second file system manipulation command among duplicates of the file system stored in the cloud storage 300, and restores the real data of the manipulation target in the file system (C12). In the present example, the file system manipulation processing unit 208 acquires real data at 8:05 of the stub directory A which is a manipulation target and restores a directory C which is a child element of the directory A to the file system.

When the determination result indicates that an immediate execution is possible, the file system manipulation processing unit 208 in the file storage 200Y executes the second file system manipulation command (C14). The unapplied manipulation history is applied to the file system in the file storage 200Y in a subsequent synchronization process.

When the determination result indicates that an immediate execution is impossible, the file system manipulation processing unit 208 acquires an unapplied manipulation history from the cloud storage 300, performs a synchronization process for applying the unapplied manipulation history to the file system, and subsequently executes the second file system manipulation command.

According to the operation, a file system manipulation command can be executed after restoring a manipulation target of the file system manipulation command. In addition, when it is determined that a file system manipulation command can be immediately executed, a response time can be reduced since a processing time for a synchronization process is no longer required. Furthermore, due to stubbing of elements in a file system, a size of the file system in the file storage 200 can be reduced.

Figure 16:
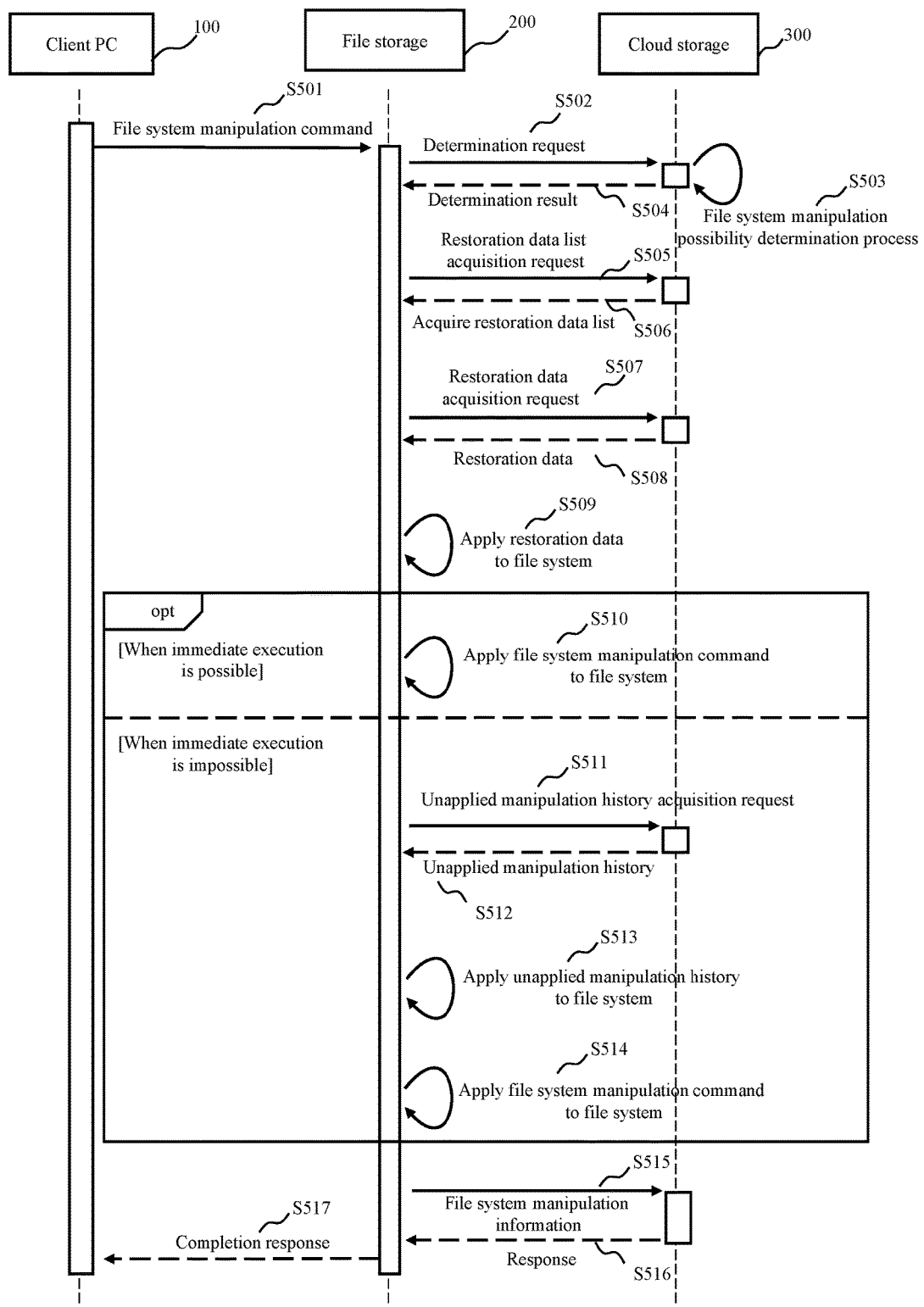
FIG. 16 is a sequence diagram showing operations of a computer system according to the third embodiment.

FIG. 16 is a sequence diagram showing operations of a computer system according to the third embodiment.

S501 to S504 are respectively similar to S101 to S104 in the first embodiment.

The file system manipulation processing unit 208 in the file storage 200 having received a determination result sets a manipulation target as a restoration target, determines whether or not the restoration target is stubbed, and executes S505 to S509 when it is determined that the restoration target is stubbed.

When it is determined that the restoration target is stubbed, the file system manipulation processing unit 208 issues a restoration data list acquisition request including the restoration target and a previous synchronization date/time to the cloud storage 300 (S505). For example, the restoration data list acquisition request indicates a manipulation target using an object ID. The object version management program 309 in the cloud storage 300 having received a restoration data list request acquires a list of all duplication dates/times of restoration targets from the object DB 317 as restoration data list information and transmits the restoration data list information to the file storage 200 (S506).

The file storage 200 having received the restoration data list information selects a latest duplication date/time preceding the previous synchronization date/time from the restoration data list information as a restoration date/time, and transmits a restoration data request including an object ID of the restoration target and the restoration date/time to the cloud storage 300 (S507). The object version management program 309 in the cloud storage 300 having received the restoration data request acquires real data at the restoration date/time of the restoration target from the object DB 317 as restoration data and transmits the restoration data to the file storage 200 (S508). The file storage 200 having received the restoration data applies the restoration data to the file system (S509).

S510 to S517 thereafter are respectively similar to S105 to S112 in the first embodiment.

According to the sequence, even when a manipulation target of a file system manipulation command is stubbed, the file storage 200 can acquire appropriate restoration data and subsequently execute the file system manipulation command.

Moreover, in place of S505 to S508, the file storage 200 may transmit a restoration data request including a manipulation target and a previous synchronization date/time to the cloud storage 300 and the cloud storage 300 may transmit real data of a latest manipulation target preceding the previous synchronization date/time as restoration data to the file storage 200.

In S504, when the file system manipulation possibility determination unit 311 determines that an immediate execution is impossible, an unapplied manipulation history may be transmitted to the file storage 200 together with a determination result. In this case, S511 and S512 are no longer necessary.

In S505 to S509, when a file system manipulation command is for a migration, the file system manipulation processing unit 208 may select a migration destination directory among manipulation targets as a restoration target.

Fourth Embodiment

Figure 17:
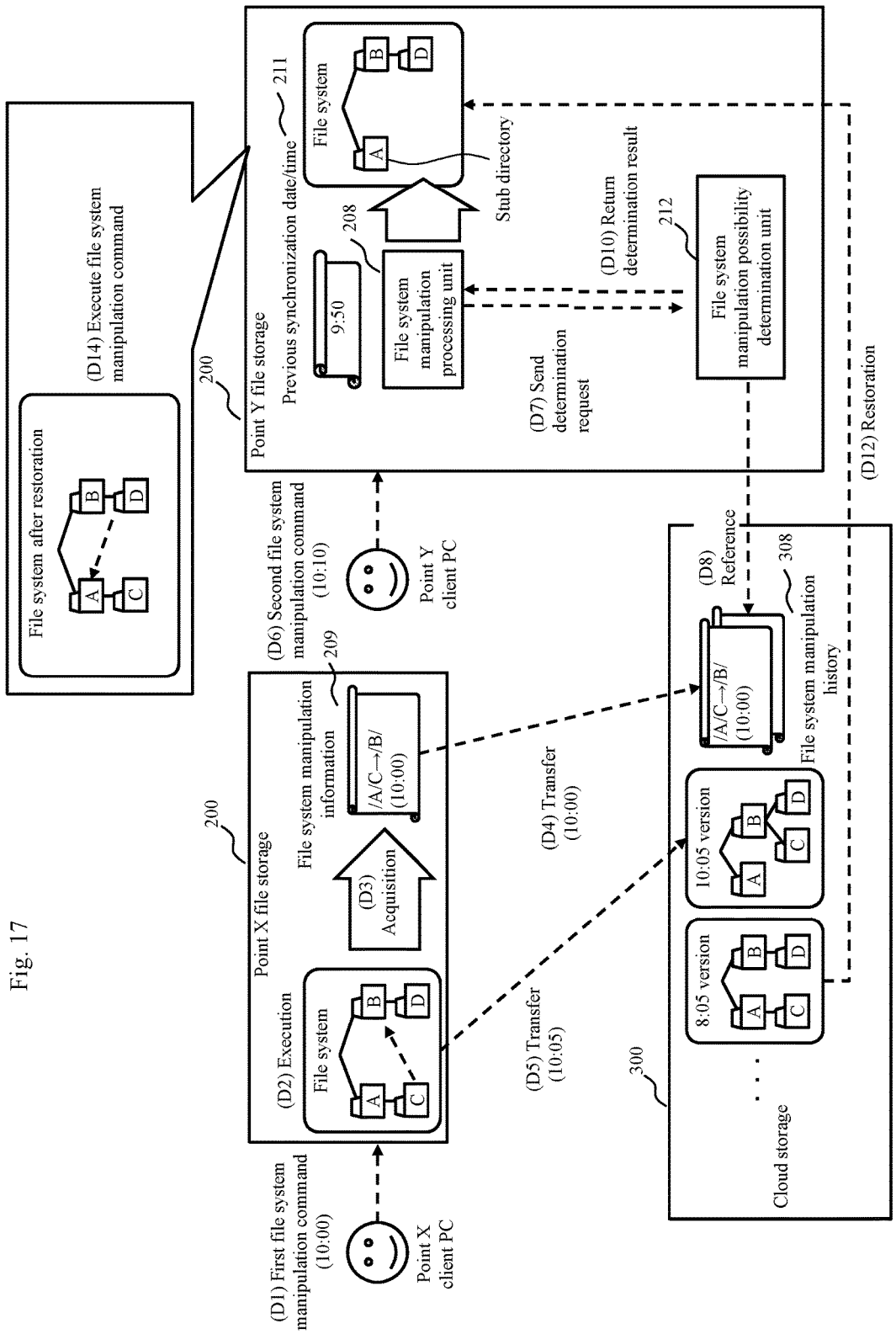
FIG. 17 shows an outline of a fourth embodiment.

FIG. 17 shows an outline of a fourth embodiment.

In comparison to the third embodiment, in the fourth embodiment, the cloud storage 300 does not include the file system manipulation possibility determination unit 311 but the file storage 200 includes the file system manipulation possibility determination unit 212 which is similar to the file system manipulation possibility determination unit 311. Hereinafter, differences from the third embodiment will be mainly described.

D1 to D6 are respectively similar to C1 to C6 in the third embodiment.

In accordance with a second file system manipulation command in D6, the file system manipulation processing unit 208 in the file storage 200Y hands over a determination request including a previous synchronization date/time and the second file system manipulation command to the file system manipulation possibility determination unit 212 (D7). The file system manipulation possibility determination unit 212 acquires an unapplied manipulation history from the cloud storage 300 by transmitting a history request including the previous synchronization date/time to the cloud storage 300 (D8). The file system manipulation possibility determination unit 212 determines whether or not the second file system manipulation command can be immediately executed based on the unapplied manipulation history, and returns a determination result to the file system manipulation processing unit 208 (D10).

Subsequently, the file system manipulation processing unit 208 in the file storage 200Y acquires real data of a latest version preceding the previous synchronization date/time which is a manipulation target of the second file system manipulation command among duplicates of the file system stored in the cloud storage 300 as restoration data, and restores the real data of the manipulation target in the file system using the restoration data (D12). Accordingly, as restoration data of the stub directory A, the file storage 200Y acquires real data indicating a child directory of A from the cloud storage 300 and restores the real data to the file system of the file storage 200Y with the child directory C of A as a stub directory.

When the determination result indicates that an immediate execution is possible, the file system manipulation processing unit 208 executes the second file system manipulation command (D14). The file system program 213 causes the directory to migrate in accordance with the file system manipulation command.

When the determination result indicates that an immediate execution is impossible, the file system manipulation processing unit 208 performs a synchronization process for applying the unapplied manipulation history to a file system and subsequently executes the second file system manipulation command.

According to the operation, even when the cloud storage 300 does not include the file system manipulation possibility determination unit 311, the file storage 200 can determine whether or not a file system manipulation command can be immediately executed. As a result, the present invention can be applied without significantly changing the cloud storage 300. In addition, when it is determined that a file system manipulation command can be immediately executed, a response time can be reduced since an application time is no longer required.

Figure 18:
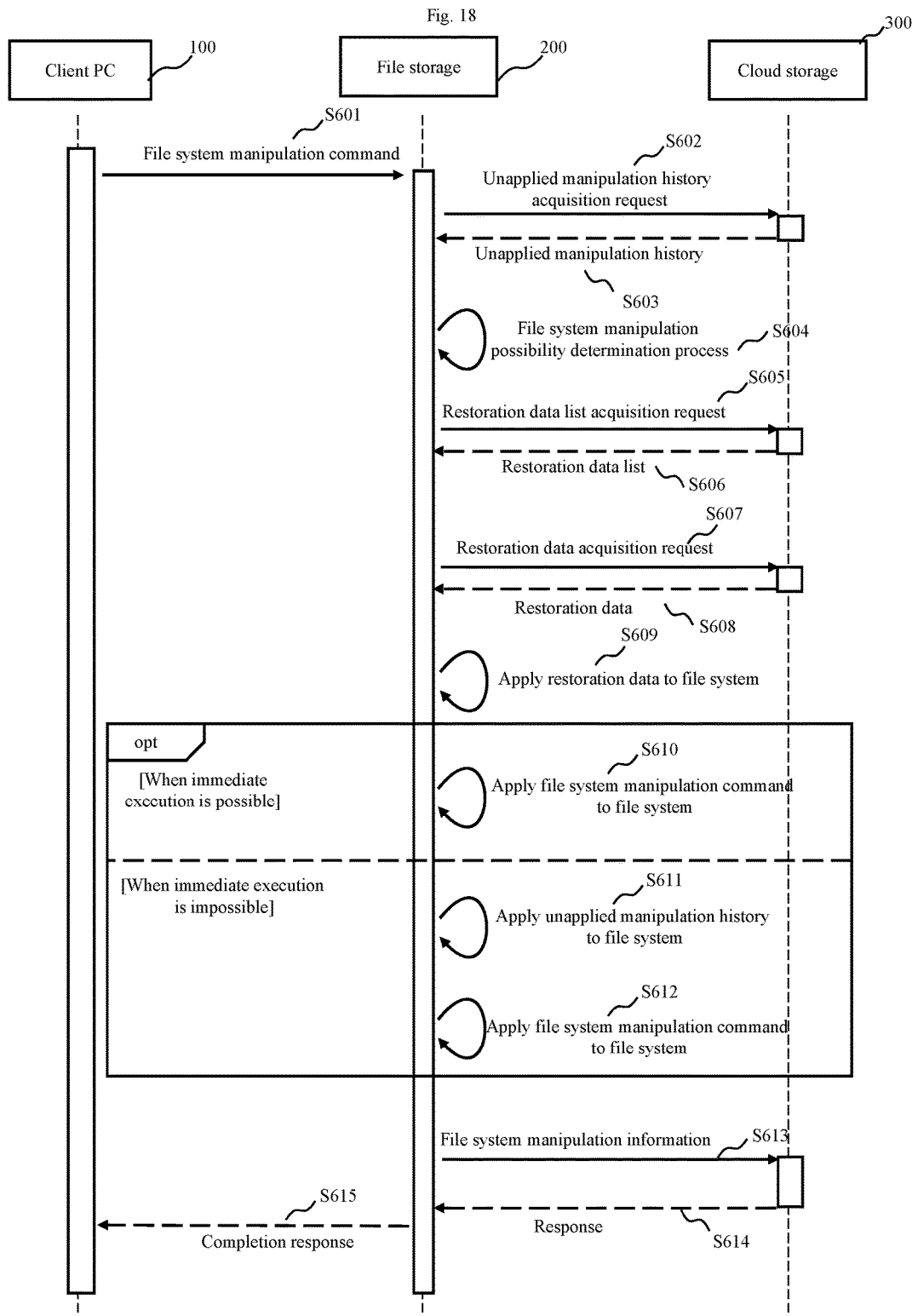
FIG. 18 is a sequence diagram showing operations of a computer system according to the fourth embodiment.

FIG. 18 is a sequence diagram showing operations of a computer system according to the fourth embodiment.

S601 to S604 are respectively similar to S401 to S404 in the second embodiment.

The file system manipulation processing unit 208 in the file storage 200 having received a determination result determines whether or not a restoration target is stubbed, and executes S605 to S609 which are similar to S505 to S509 in the third embodiment when it is determined that the restoration target is stubbed.

S610 to S615 thereafter are respectively similar to S405 to S410 in the second embodiment.

According to the sequence, even when a manipulation target of a file system manipulation command is stubbed, the file storage 200 can acquire appropriate restoration data and subsequently execute the file system manipulation command.

Moreover, information indicating a state of a file system manipulation history such as a version number may be used in place of a file system manipulation date/time. Information indicating a state of a file system such as a version number may be used in place of a previous synchronization date/time. Information indicating a state of a file system manipulation history such as a version number may be used in place of a duplication date/time.

Terms used in the expressions of the present invention will now be described. A file storage apparatus may include the file storage 200. A cloud storage apparatus may include the cloud storage 300. A command may include a file system manipulation command. Manipulation information may include the file system manipulation information 209. A manipulation history may include the file system manipulation history 308. An unapplied manipulation may include an unapplied manipulation history. An application time point may include a previous synchronization time point. A display apparatus may include the management client 120. A management computer may include the management server 110.

REFERENCE SIGNS LIST 100, 100X, 100Y Client PC
110 Management server
120 Management client
200, 200X, 200Y File storage
201 File storage controller
202 Storage apparatus
300 Cloud storage
301 Cloud storage controller
302 Storage apparatus

The invention claimed is:

1. A computer system, comprising:
a plurality of file storage apparatuses; and
a cloud storage apparatus coupled with the plurality of file storage apparatuses, wherein:
a file storage apparatus which is one of the plurality of file storage apparatuses is configured to store a file system, and when executing a manipulation of the file system, transmit manipulation information representing the executed manipulation to the cloud storage apparatus,
the cloud storage apparatus is configured to store a manipulation history which is a history of the manipulation information, the manipulation history including an unapplied manipulation history which is a manipulation that has previously been executed by the one of the plurality of file storage apparatuses and has not been applied to the file system,
a specific apparatus, which is any one of the plurality of file storage apparatuses or the cloud storage apparatus, is configured to, when the any one of the plurality of file storage apparatuses receives a command for a specific manipulation of the file system, determine, based on a state of the file system and the manipulation history, whether or not the unapplied manipulation affects a target of the specific manipulation, and
the file storage apparatus is configured to, when determination is made that the unapplied manipulation affects the target of the specific manipulation, apply the unapplied manipulation to the file system, execute the specific manipulation on the file system, and transmit manipulation information representing the specific manipulation to the cloud storage apparatus.

2. The computer system according to claim 1, wherein
the specific apparatus is the file storage apparatus, and
the file storage apparatus is configured to, when receiving the command, acquire the unapplied manipulation from the cloud storage apparatus, based on the state, and determine whether or not the unapplied manipulation affects the target.

3. The computer system according to claim 1, wherein
the specific apparatus is the cloud storage apparatus, and
the file storage apparatus is configured to, when receiving the command, transmit the state to the cloud storage apparatus, and
the cloud storage apparatus is configured to, based on the state, select the unapplied manipulation and determine whether or not the unapplied manipulation affects the target.

4. The computer system according to claim 1, wherein
the file storage apparatus is configured to, when determination is made that the unapplied manipulation does not affect the target, execute the specific manipulation on the file system, and transmit manipulation information representing the specific manipulation to the cloud storage apparatus.

5. The computer system according to claim 4, wherein
the manipulation information includes an execution time representing a time of day of execution of the manipulation,
the state includes an application time representing a time of day of a latest application of the unapplied manipulation, and
the specific apparatus is configured to select, as the unapplied manipulation, a manipulation executed after the application time in the manipulation history.

6. The computer system according to claim 5, wherein
the file storage apparatus is configured to periodically acquire the unapplied manipulation from the cloud storage apparatus and apply the unapplied manipulation to the file system.

7. The computer system according to claim 6, wherein
any of the plurality of file storage apparatuses is configured to store an element which is a directory or a file and transfer the element to the cloud storage apparatus,
the element includes metadata and real data,
the cloud storage apparatus is configured to store the element for each time of day of the transfer, and
the file storage apparatus is configured to, when receiving the command, determine whether or not the file system stores real data of the target, and when determination is made that the file system does not store the real data of the target, acquire the real data of the target at a time of day of a latest transfer preceding the application time point from the cloud storage apparatus, and apply the acquired real data to the file system.

8. The computer system according to claim 1, further comprising
- a management computer configured to cause a display apparatus to display a configuration screen for inputting configuration information including information for the plurality of file storage apparatuses and the cloud storage apparatus to communicate with each other and information indicating whether or not the determination is to be performed, acquire the configuration information, and transmit the configuration information to the plurality of file storage apparatuses and to the cloud storage apparatus.

9. The computer system according to claim 1, wherein
the specific apparatus is configured to, when a path of the target changes between before an application of the unapplied manipulation and after the application of the unapplied manipulation, determine that the unapplied manipulation affects the target.

10. The computer system according to claim 9, wherein
the specific apparatus is configured to, when the unapplied manipulation includes a manipulation to change a path of the target but does not include a manipulation of reverting the change after the manipulation of changing the path of the target, determine that the unapplied manipulation affects the target.

11. A file storage apparatus, comprising:
- a storage device; and
- a controller which is coupled with a cloud storage apparatus coupled with another file storage apparatus and which is coupled with the storage device, wherein
- the controller is configured to store a file system in the storage device, and when executing a manipulation of the file system, transmit manipulation information representing the executed manipulation to the cloud storage apparatus,
- a manipulation history which is a history of the manipulation information is stored in the cloud storage apparatus, the manipulation history including an unapplied manipulation history which is a manipulation that has previously been executed by the one of the plurality of file storage apparatuses and has not been applied to the file system,
- when the controller receives a command for a specific manipulation of the file system, a specific apparatus which is either the controller or the cloud storage apparatus is configured to, based on a state of the file system and the manipulation history, determine whether or not the unapplied manipulation affects a target of the specific manipulation, and
- the controller is configured to, when determination is made that the unapplied manipulation affects the target of the specific manipulation, apply the unapplied manipulation to the file system, execute the specific manipulation on the file system, and transmit manipulation information representing the specific manipulation to the cloud storage apparatus.

12. A storage control method, comprising:
storing a file system by using a file storage apparatus and, when executing a manipulation of the file system, transmitting manipulation information representing the executed manipulation to a cloud storage apparatus coupled with another file storage apparatus;
storing a manipulation history which is a history of the manipulation information by using the cloud storage apparatus, the manipulation history including an unapplied manipulation history which is a manipulation that has previously been executed by the one of the plurality of file storage apparatuses and has not been applied to the file system;
when the file storage apparatus receives a command for a specific manipulation of the file system, determining, based on a state of the file system and the manipulation history, whether or not the unapplied manipulation affects a target of the specific manipulation by using a specific apparatus which is either the file storage apparatus or the cloud storage apparatus; and
when determination has been made that the unapplied manipulation affects the target of the specific manipulation, applying the unapplied manipulation to the file system, executing the specific manipulation on the file system, and transmitting manipulation information representing the specific manipulation to the cloud storage apparatus using the file storage apparatus.

* * * * *